(12) United States Patent
Okazaki et al.

(10) Patent No.: US 8,784,675 B2
(45) Date of Patent: Jul. 22, 2014

(54) OPTICAL DEVICE, A METHOD OF MANUFACTURING OPTICAL DEVICE, AND EXPOSURE APPARATUS

(75) Inventors: Masahide Okazaki, Kyoto (JP); Toshiaki Suhara, Osaka (JP)

(73) Assignee: Dainippon Screen Mfg. Co. Ltd. (JP)

( * ) Notice: Subject to any disclaimer, the term of this patent is extended or adjusted under 35 U.S.C. 154(b) by 231 days.

(21) Appl. No.: 13/206,086

(22) Filed: Aug. 9, 2011

(65) Prior Publication Data

US 2012/0081772 A1  Apr. 5, 2012

(30) Foreign Application Priority Data

Sep. 30, 2010 (JP) .................. 2010-221699

(51) Int. Cl.
- *B29D 11/00* (2006.01)
- *G02F 1/03* (2006.01)
- *G02F 1/29* (2006.01)
- *G02B 5/30* (2006.01)

(52) U.S. Cl.
USPC ............ 216/24; 359/245; 359/251; 359/252; 359/254; 359/255; 359/290; 359/295; 359/296; 359/303; 359/315; 359/484.01; 359/489.06

(58) Field of Classification Search
USPC ......... 359/245, 251, 252, 254, 255, 290, 295, 359/296, 303, 315, 321–323, 484.01–484.1, 359/489.06; 216/24
See application file for complete search history.

(56) References Cited

U.S. PATENT DOCUMENTS

| | | | |
|---|---|---|---|
| 4,281,904 A | 8/1981 | Sprague et al. | |
| 4,376,568 A | 3/1983 | Sprague | |
| 5,652,674 A | 7/1997 | Mizuuchi et al. | 359/326 |
| 6,169,565 B1 | 1/2001 | Ramanujan et al. | |
| 7,453,625 B2 * | 11/2008 | Yamaguchi et al. | 359/322 |
| 2003/0133680 A1 | 7/2003 | Yokoyama et al. | 385/129 |
| 2006/0286710 A1 | 12/2006 | Sugita et al. | 438/106 |
| 2007/0237481 A1 | 10/2007 | Yoshino et al. | 385/129 |
| 2009/0231679 A1 | 9/2009 | Yoshino | 359/328 |
| 2010/0166356 A1 | 7/2010 | Okazaki et al. | |

FOREIGN PATENT DOCUMENTS

| | | |
|---|---|---|
| JP | 57-156273 | 9/1982 |
| JP | 62-8770 | 2/1987 |
| JP | 1-144074 | 6/1989 |

(Continued)

OTHER PUBLICATIONS

Gnewuch, et al., "Nanosecond Response of Bragg Deflectors in Periodically Poled LiNbO3," IEEE Photonics Technology Letters, vol. 10, No. 12, pp. 1730-1732 (1998).

(Continued)

*Primary Examiner* — Evelyn A. Lester
(74) *Attorney, Agent, or Firm* — Ostrolenk Faber LLP

(57) ABSTRACT

The ferroelectric substrate 11 of ferroelectric crystals, while being supported by the support plate 14 which is thicker than the ferroelectric substrate 11, is integrated with the support plate 14 by letting the junction 13 mediate between one major surface S1A of the ferroelectric substrate 11 and one major surface S1B of the support plate 14, and therefore, it is possible through the flat surface polishing to perform thinning of the ferroelectric substrate 11, namely, the ferroelectric crystals, and as a result, it is possible to obtain the thin periodically poled structure. By the voltage application method, the domain inverted region is formed in the ferroelectric substrate 11 which is made thin.

9 Claims, 17 Drawing Sheets

(56) References Cited

FOREIGN PATENT DOCUMENTS

| | | |
|---|---|---|
| JP | 7-56128 | 3/1995 |
| JP | 08-220578 | 8/1996 |
| JP | 2000-313141 | 11/2000 |
| JP | 2002-258340 | 9/2002 |
| JP | 2003-270467 | 9/2003 |
| JP | 2006-133594 | 5/2006 |
| JP | 2007-256324 | 10/2007 |
| JP | 2009-31732 | 2/2009 |
| JP | 2009-222963 | 10/2009 |
| JP | 2010-152212 | 7/2010 |
| JP | 2010-152213 | 7/2010 |
| JP | 2010-152214 | 7/2010 |
| JP | 2011-085610 | 4/2011 |
| WO | WO 2005/045908 | 5/2005 |

OTHER PUBLICATIONS

Hirano, Yoshihito, "Compact wavelength-conversion green laser and its application to laser TV," OYO BUTURI, vol. 78, No. 11, pp. 1039-1043 (2009) English Language Abstract.

* cited by examiner

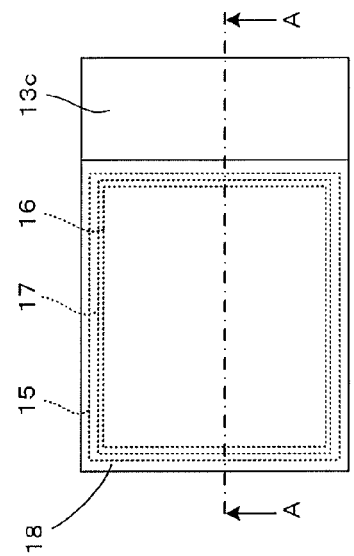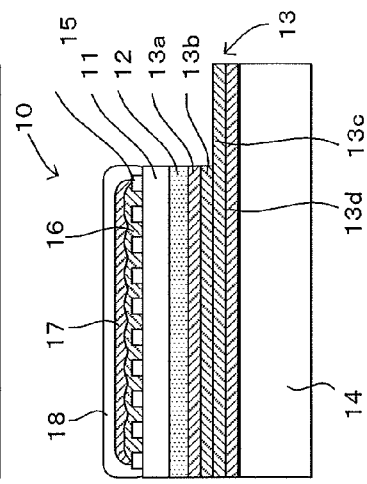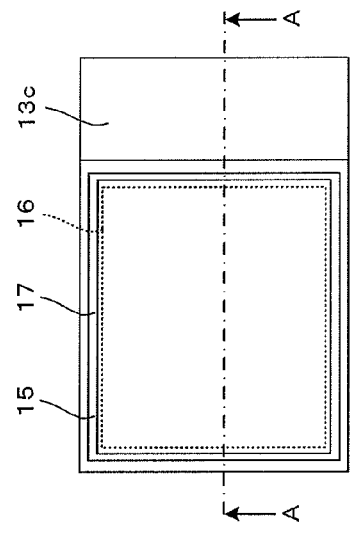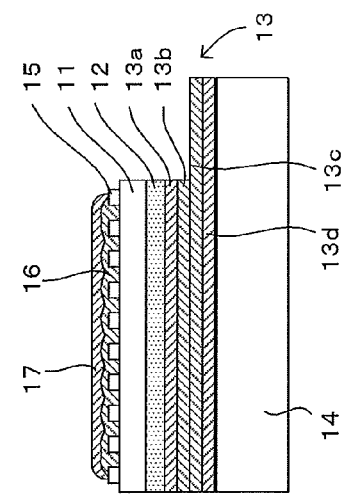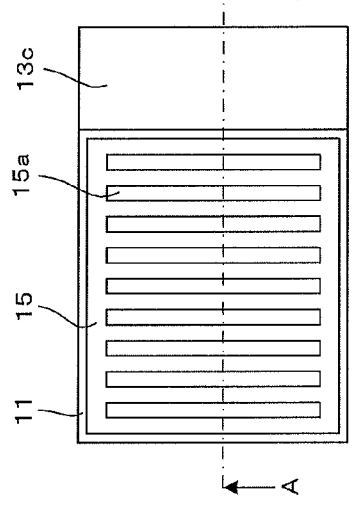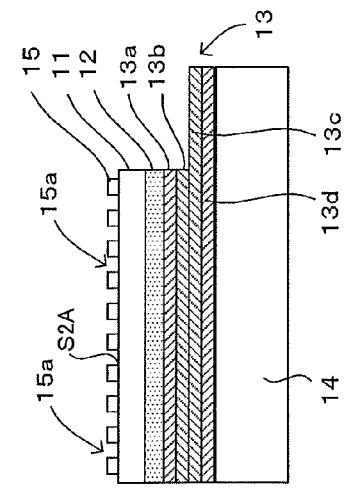
FIG. 3A  FIG. 3B  FIG. 3C

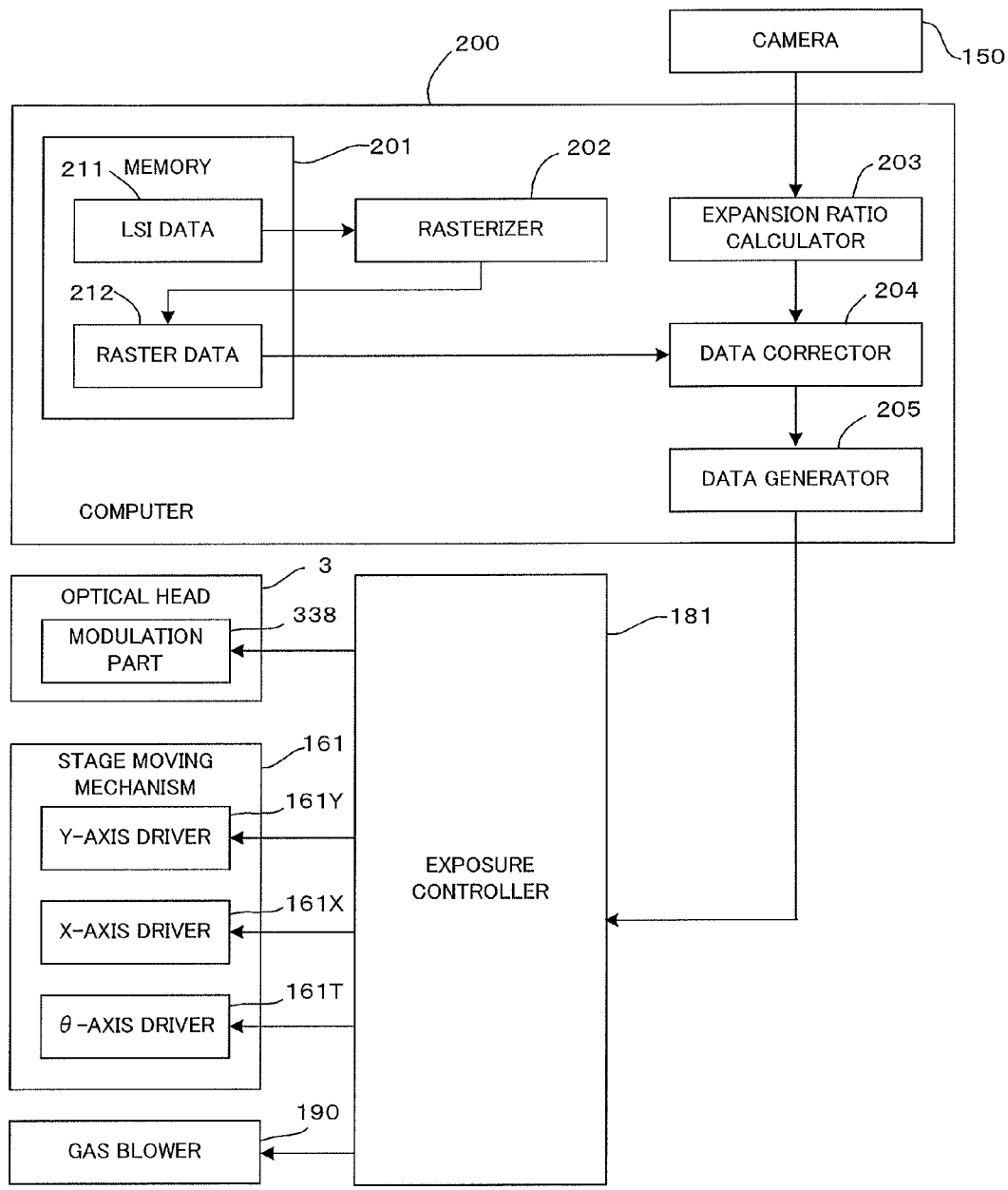

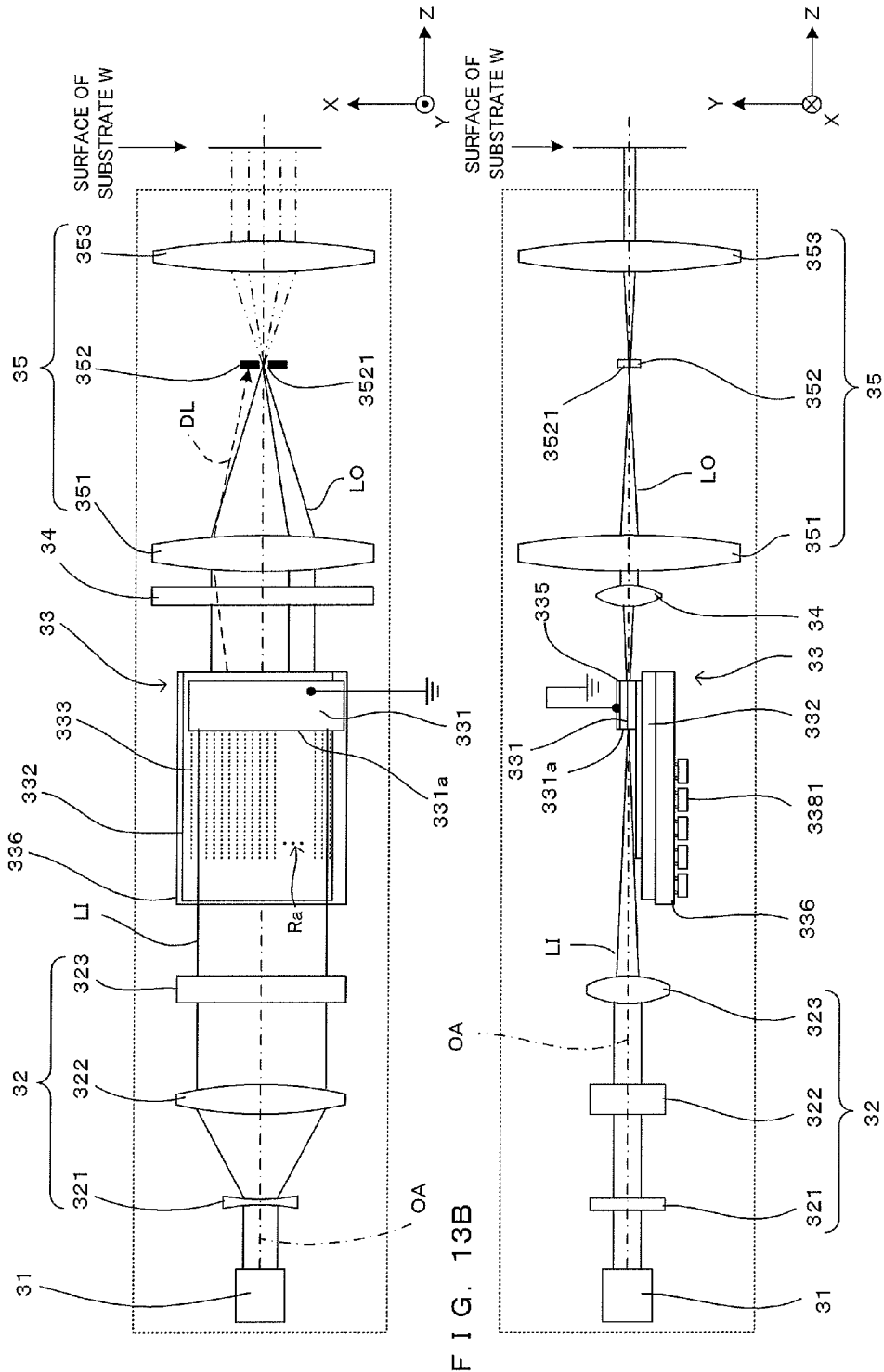

FIG. 14A: YZ PLANE
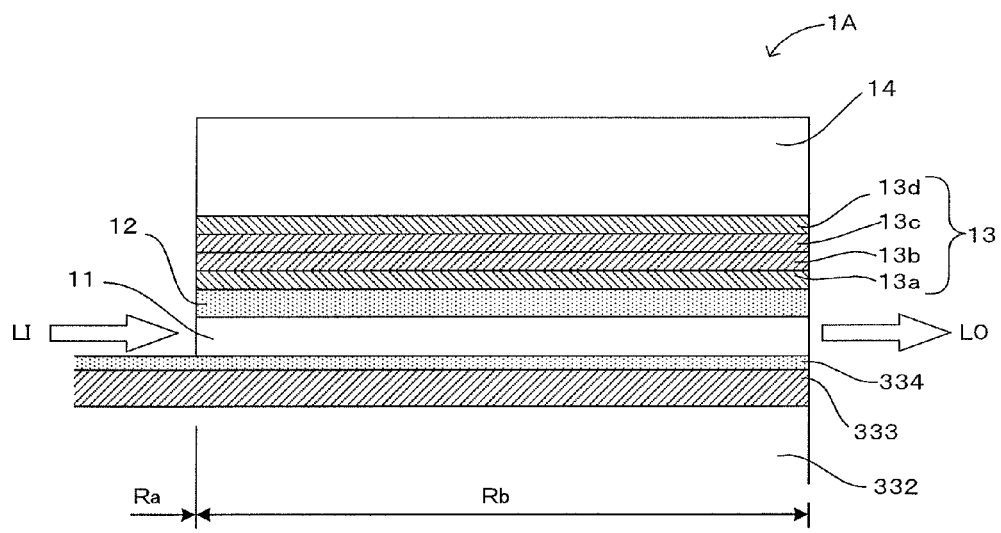
FIG. 14B: XY PLANE
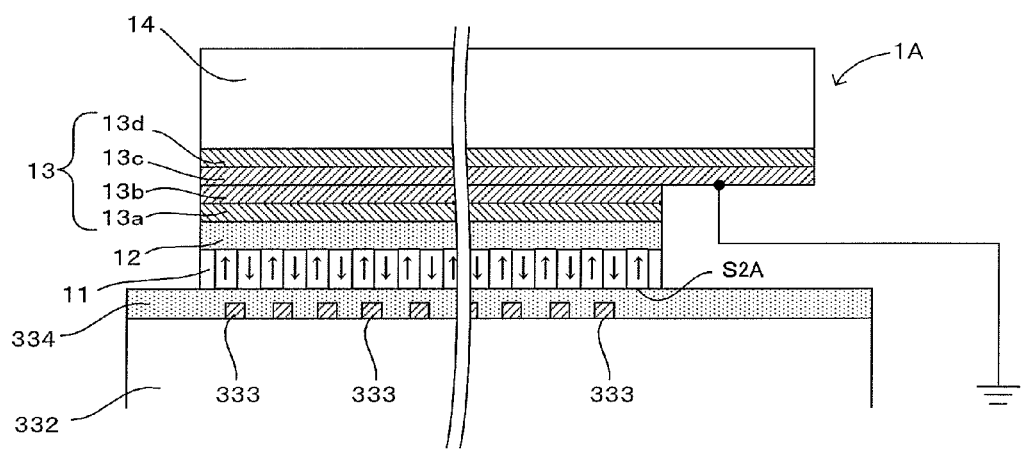

OPTICAL DEVICE, A METHOD OF MANUFACTURING OPTICAL DEVICE, AND EXPOSURE APPARATUS

CROSS REFERENCE TO RELATED APPLICATION

The disclosure of Japanese Patent Application No. 2010-221699 filed Sep. 30, 2010 including specification, drawings and claims is incorporated herein by reference in its entirety.

BACKGROUND OF THE INVENTION

1. Field of the Invention

The present invention relates to an optical device having a periodically poled structure (hereinafter referred to simply as the "optical device"), a method of manufacturing the optical device and an exposure apparatus which uses the optical device.

2. Description of the Related Art

Ferroelectric crystals of lithium niobate ($LiNbO_3$), lithium tantalite ($LiTaO_3$) and the like have been under consideration as liquid crystals to be applied to optical devices for controlling light modulation, wavelength conversion, etc. The Document 1 (H. Gnewuch et al "Nanosecond Response of Bragg Deflectors in Periodically Poled $LiNbO_3$", IEEE PHOTONICS TECHNOLOGY LETTERS, VOL. 10, NO. 12, DECEMBER 1998) for instance describes a Bragg-deflection type optical modulator using periodically poled ferroelectric crystals. Further, the Document 2 (Yoshihito Hirano, "Super-compact wavelength conversion green laser and laser TV", Applied Physics, Vol. 78, No. 11 (2009)) for instance describes a wavelength conversion device using a periodically poled planar waveguide (MgO:LN (PPMgLN)).

SUMMARY OF THE INVENTION

By the way, while the optical modulator according to the Document 1 is capable of modulating light due to the electro-optical effect, it is difficult to for this optical modulator to perform modulation at a high speed since the thickness of the ferroelectric crystals is approximately 300 μm, the domain-inverted period is as rough as 40 μm and the required driving voltage must be as high as 25 V or more. Hence, it is necessary to decrease the driving voltage in order to realize even faster modulation. One of the approaches to achieve this is to reduce the thickness of the ferroelectric crystals (which is known also as thinning). In short, as the ferroelectric crystals are formed as a thin film, the distance between electrodes for applying a voltage upon the ferroelectric crystals becomes shorter, thereby making it possible to decrease the driving voltage. Further, while the domain-inverted period of 3 μm is realized on a waveguide which has the width of a few μm in the wavelength conversion device, a further improvement is desired such as improvement of the accuracy of forming the domain inverted structure, shortening of the domain-inverted period which will makes it possible to shorten the converted wavelength.

The voltage application method (known also as "the electric field application method" and "the pulse electric field application method") is currently used as a principal method of forming a periodically poled structure. The voltage application method requires forming a lattice-like electrode on one side of ferroelectric crystals having the thickness of 150 μm through 500 μm, applying a high voltage beyond the domain inverted voltage, which is one of the characteristics unique to the material, between this electrode and an electrode formed on the other side, and thereafter reversing the direction of polarization. The period can therefore be as short as approximately 3 μm, and it is extremely difficult to maintain a uniform accuracy over a wide surface area.

The invention has been made in light of the problems described above. Accordingly, the invention is related to an optical device in which a periodically poled structure is formed in a ferroelectric substrate of ferroelectric crystals, and an object of the invention is to provide a technology which makes it possible to reduce the thickness of ferroelectric crystals and increase the accuracy of the periodically poled structure.

According to a first aspect of the invention, there is provided an optical device, comprising: a ferroelectric substrate formed by ferroelectric crystals having a periodically poled structure; a support plate which is thicker than the ferroelectric substrate; and a junction, held between one major surface of the ferroelectric substrate and one major surface of the support plate opposed to one major surface of the ferroelectric substrate, and which integrates the ferroelectric substrate with the support plate to support the ferroelectric substrate with the support plate.

According to a second aspect of the invention, there is provided a manufacturing method of optical device, comprising: a first step of integrating a ferroelectric substrate formed by ferroelectric crystals with a support plate which is thicker than the ferroelectric substrate to support the ferroelectric substrate with the support plate by a conductive junction between one major surface of the ferroelectric substrate and one major surface of the support plate; a second step of forming a pattern electrode which has a periodic pattern on the other major surface of the ferroelectric substrate; and a third step of applying a voltage between the pattern electrode and the junction and forming a periodic domain inverted region in the ferroelectric substrate.

According to a third aspect of the invention, there is provided a method of manufacturing optical device comprising a first step of integrating a ferroelectric substrate with a support plate to support ferroelectric substrate with a support plate by a conductive junction between one major surface of the ferroelectric substrate and one major surface of the support plate, the ferroelectric substrate being formed by ferroelectric crystal having a periodically poled structure, the support plate being thicker than the ferroelectric substrate.

According to the aspects of the invention, since the ferroelectric substrate having the periodically poled structure is supported by the support plate via the junction, it is possible to thin the ferroelectric crystals having the periodically poled structure. And it is possible to manufacture the periodically poled structure at a high accuracy. Hence, when an optical modulator is fabricated using the optical device described above for instance, since the crystal thickness of the ferroelectric crystals having the periodically poled structure is thin, the distance between the electrodes is short, the driving voltage can be suppressed low, and high-speed modulation is therefore possible. Meanwhile, in the case of a wavelength conversion device which uses the optical device described above for example, fabrication of domain inverted structure having a short period is possible because of thinning of ferroelectric crystals, which realizes further shortening of the conversion wavelength. Further, since the highly accurate periodically poled structure, that is, the periodically poled structure which is uniform with little variations of the period is obtained, it is possible to improve the conversion efficiency. In addition, safe work is possible since it is possible to reduce the applied voltage which is for forming the periodically poled structure.

Further, an optical modulator can be formed using the optical device which has the structure described above and the optical modulator can be used in an exposure apparatus. That is, according to fourth aspect of the invention, there is provided an exposure apparatus comprises: a light source which emits light; an optical modulator which modulates light emitted from the light source; and an optical device which irradiates light modulated by the optical modulator, wherein the optical modulator comprises: the optical device according to claim 1; a plurality of electrodes which are disposed on the other major surface of the ferroelectric substrate; and a modulation part which modulates light with a diffraction grating created inside the ferroelectric substrate by electric fields between the plurality of electrodes and the junction.

As described above, according to the aspects of the invention, the ferroelectric substrate formed by ferroelectric crystals is bonded with the support plate by the junction and the periodically poled structure is formed in the ferroelectric substrate. Thinning of the ferroelectric crystals is therefore possible, and in addition, the highly accurate periodically poled structure can be obtained.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 3A through 3C are drawings which show the manufacturing method of the optical device shown in FIG. 1.

FIG. 12 is a block diagram which shows the electric structure of the pattern drawing apparatus of FIG. 10.

FIGS. 13A and 13B are simplified views of the internal structure of the optical head.

FIGS. 14A and 14B are views which show an example of the spatial optical modulator using the optical device shown in FIG. 1.

DETAILED DESCRIPTION OF THE PREFERRED EMBODIMENTS

First Embodiment

Figure 1:
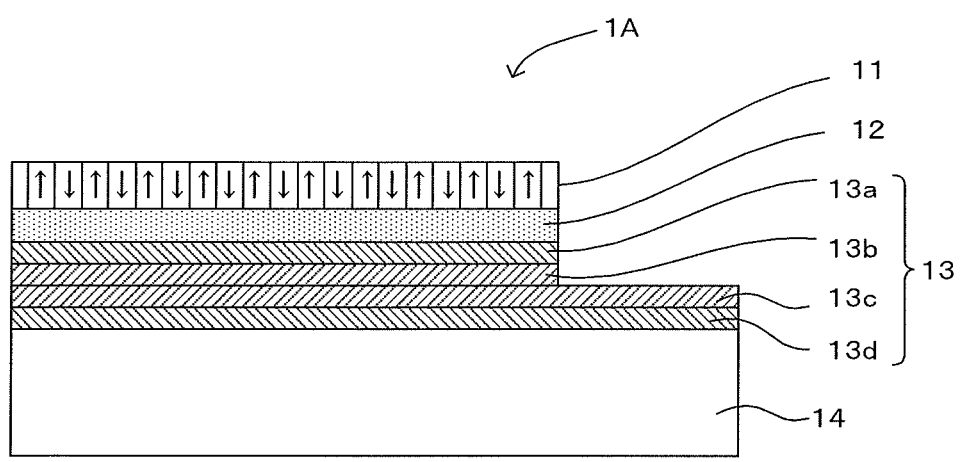
FIG. 1 is a cross sectional view which shows a first embodiment of an optical device according the invention.

FIG. 1 is a cross sectional view which shows a first embodiment of an optical device according the invention. The optical device 1A comprises a ferroelectric substrate 11 formed by periodically domain inverted (periodically poled) ferroelectric crystals, and a support plate 14 supports the ferroelectric substrate 11 via an insulation layer 12 of $SiO_2$ or the like and a junction 13 which has a quadruple-layer structure. In this embodiment, processing described later is performed on a single crystal substrate of lithium niobate (MgO:lithium niobate) added with magnesium oxide (MgO) or stoichiometric lithium tantalite (MgO:stoichiometric lithium tantalite) added with magnesium oxide (MgO), whereby the periodically domain inverted ferroelectric substrate 11 is formed as a thin film. Lithium niobate added with magnesium oxide (MgO) will be hereinafter referred to as "MgO:LN" and stoichiometric lithium tantalite added with magnesium oxide will be hereinafter referred to as "MgO:SLT." The insulation layer 12 is uniformly formed all over the bottom surface of the ferroelectric substrate 11. In addition, a chromium (Cr) film 13a and a gold (Au) film 13b are disposed in this order to the insulation layer 12, and the chromium film 13a and the gold film 13b form a first metal layer of a double-layer structure.

The support plate 14 is a thicker plate-like member than the periodically domain inverted ferroelectric substrate 11, and according to this embodiment, has the same composition as that of the ferroelectric substrate 11 and is formed by a single crystal substrate of MgO:LN or MgO:SLT having the same absolute value of the crystal orientation as that of the ferroelectric substrate 11. Although the support plate 14 is longer than the ferroelectric substrate 11 according to this embodiment as shown in FIG. 1, this is for rational manufacturing of the optical device 1A by a method which will be described later and for the rationale use of the optical device 1A as an optical modulator as described later, and therefore, the shape of the substrate is not limited to this but may be any desired shape: for instance, the support plate 14 may of course have the same shape as the ferroelectric substrate 11 as described in a third through a fifth embodiment which will be described later. The material, the composition and the like of the support plate 14 may also be chosen as desired. However, forming the support plate 14 by the same liquid crystals as those of the ferroelectric substrate 11 as in the first embodiment improves the environment resistance and is therefore preferable. This remains the same on the optical devices which will be described later.

The chromium (Cr) film 13d is uniformly formed all over the top surface of the support plate 14 having the structure described above, and the gold (Au) film 13c is uniformly formed all over the top surface of the chromium film 13d. A second metal layer having a double-layer structure formed by the chromium film 13d and the gold film 13c is formed on the top surface of the support plate 14. The gold film 13c forming the second metal layer is joined with the gold film 13b forming the first metal layer, whereby the quadruple-layer junction 13 is formed and the ferroelectric substrate 11 is integrated with the support plate 14. Their shapes, how they are joined and other aspects will be described in detail while referring to a manufacturing method which will now be described right below.

Figure 2A:
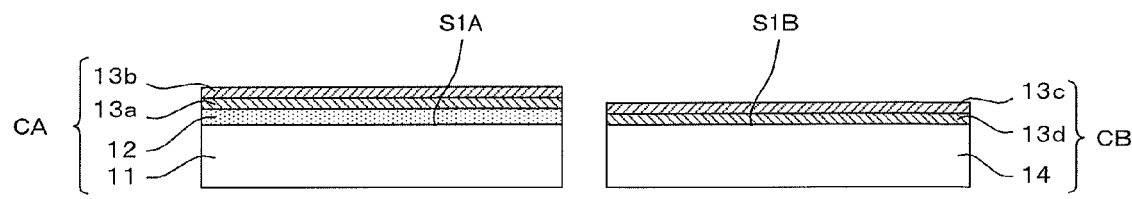
FIGS. 2A through 2D are drawings which show the manufacturing method of the optical device shown in FIG. 1.
Figure 4A:
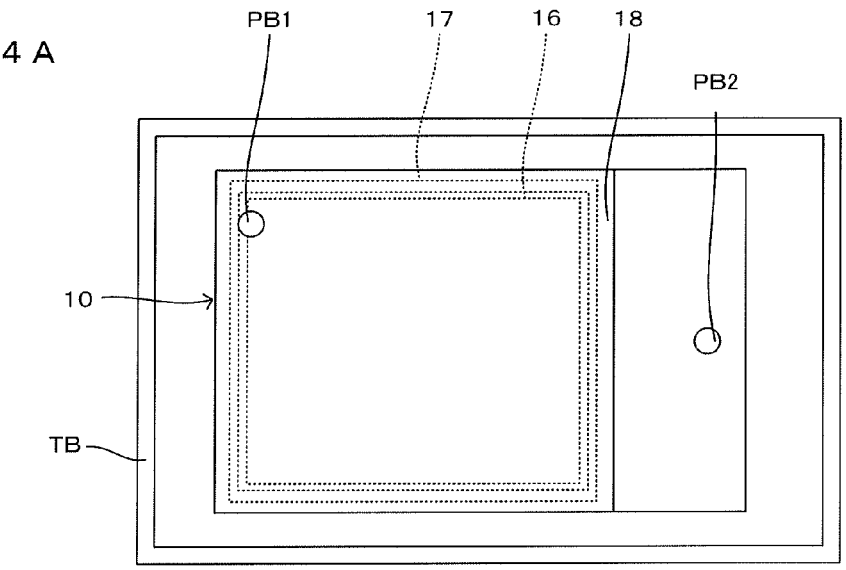
FIGS. 4A through 4B are drawings which show the manufacturing method of the optical device shown in FIG. 1.
Figure 4B:
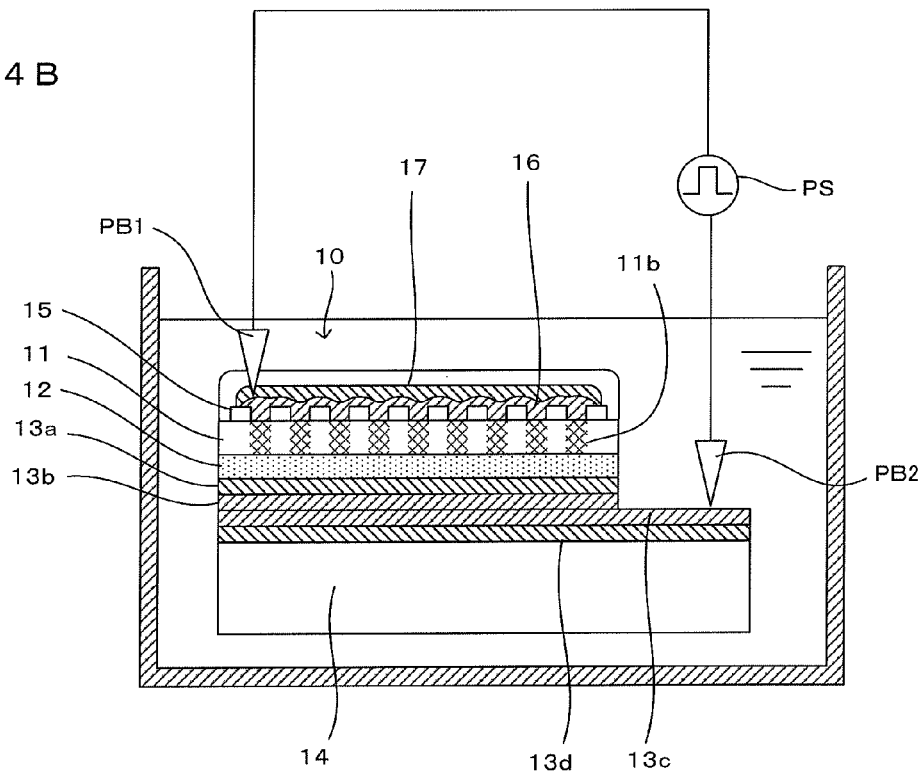

FIGS. 2A through 4B are drawings which show the manufacturing method of the optical device shown in FIG. 1. The top drawings in FIGS. 3A through 3C are plan views viewed from above, while the bottom drawings are cross sectional views taken along the lines A-A in the plan views. FIG. 4A is a plan view viewed from above, and FIG. 4B is a cross sectional drawing of the plan view. In this embodiment, first, from a single crystal wafer of single-polarized MgO:LN or MgO:SLT, rectangular chips CA and CB of the same size as that of the support plate 14 are cut out as the raw materials of the ferroelectric substrate 11 and the support plate 14, respectively. At this stage, notches representing the crystal orientation are created in the chips CA and CB as markers. The chips CA and CB are set to a jig, with one major surface S1A of the chip CA and one major surface S1B of the chip CB directed toward above. The insulation layer 12 is formed only on one major surface S1A of the chip CA. Following this, through sputtering, the chromium film and the gold film are formed in this order respectively on the insulation layer 12 of the chip CA and one major surface S1B of the chip CB. In this fashion, the insulation layer 12, the chromium film 13a and the gold film 13b are formed on one major surface S1A of the ferroelectric substrate 11 in the chip CA, simultaneously with which the chromium film 13d and the gold film 13c are formed on one major surface S1B of the support plate 14 in the chip CB (FIG. 2A). Although the chromium films and the gold films are formed by sputtering in the first embodiment, they may be formed by other method such as deposition.

Figure 2B:
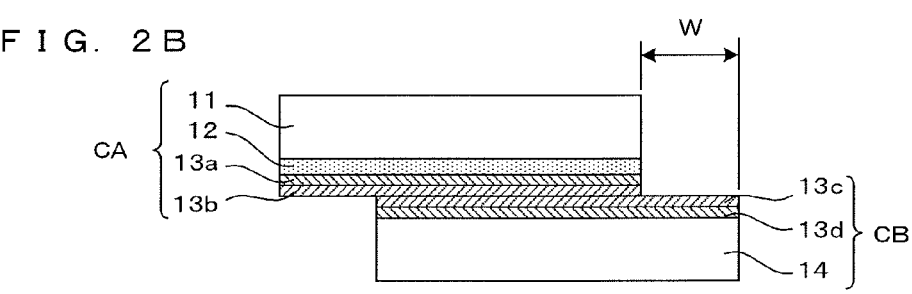

Next, after unloading the chips CA and CB from the jig, a fast atom beam (FAB) of argon is irradiated upon the gold films 13b and 13c and the chip surfaces are activated. The chip CA is then reversed upside down, the gold film 13b of the chip CA and the gold film 13c of the chip CB are tightly adhered to each other while held opposed to each other, and the chip CA is disposed on top of and accordingly bonded to the chip CB (FIG. 2B). The quadruple-layer junction 13 is formed as a result of this FAB bonding, whereby the chips CA and CB are integrated with each other. At this stage, as shown in FIG. 2B, the chips CA and CB are shifted from each other by a distance W in the longitudinal direction of the chips CA and CB (the horizontal direction in FIG. 2B) and disposed one atop the other in the vertical direction. The FAB bonding may be replaced with oxygen plasma hydrophilic treatment, or alternatively, by soldering.

Figure 2C:
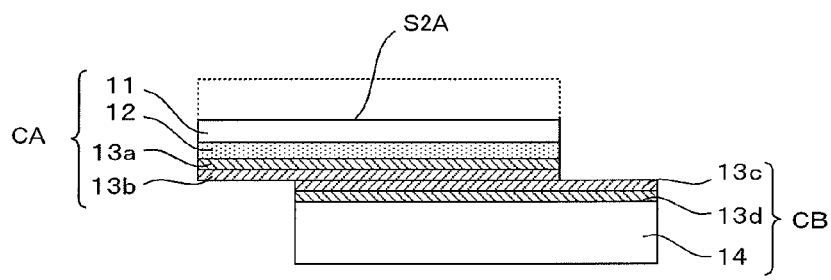
Figure 2D:
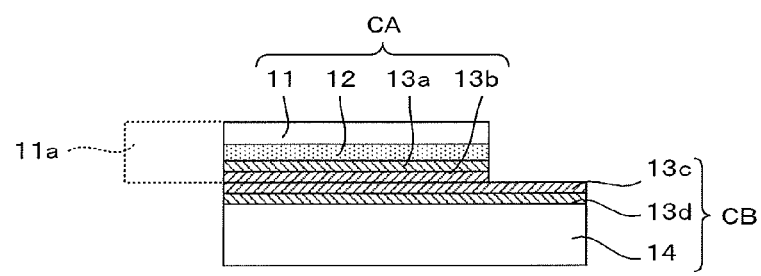

The other major surface of the chip CA integrated with the chip CB, i.e., the other major surface S2A of the ferroelectric substrate 11 is polished by flat surface polishing and the ferroelectric substrate 11 is made into a thin film (FIG. 2C). As described later, considering application of the optical device 1A to an optical modulator, a wavelength conversion device, etc., it is desirable to reduce the thickness of the ferroelectric substrate 11 down to 0.1 μm through 200 μm. This similarly applies to the other embodiments which will be described later.

Since the ferroelectric substrate 11 is integrated with the support plate 14 via the insulation layer 12 and the junction 13 according to the first embodiment as described above, it is possible to easily reduce the thickness of the ferroelectric substrate 11 down to a desired thickness and make the ferroelectric substrate 11 as a thin film at a high accuracy. Meanwhile, when the thickness of the ferroelectric substrate 11 after polishing is compared with that of the support plate 14, the support plate 14 naturally has the same thickness as the wafer and is sufficiently thicker than the polished ferroelectric substrate 11, and therefore, the support plate 14 is capable of firmly supporting the ferroelectric substrate 11 which is thinned.

After severing the end 11a of the chip CA which sticks out beyond the chip CB in the longitudinal direction at the end surface of the chip CB (FIG. 2D), a resist layer 15 in which a plurality of concave sections 15a are periodically formed is formed on the other major surface S2A of the ferroelectric substrate 11 (FIG. 3A). Describing more specifically, after applying a photoresist film entirely on the other major surface S2A of the ferroelectric substrate 11, the photoresist film is patterned by the so-called photolithographic method. In this manner, according to the first embodiment, on the resist layer 15, in regions corresponding to domain inverted regions of the photoresist film which are to be formed in the ferroelectric substrate 11, a pattern in which the plurality of concave sections 15a are formed which extend in the width direction (the vertical direction in the top drawings in FIGS. 3A through 3C) is formed.

Following this, a chromium film 16 is formed on thus patterned resist layer 15 by sputtering (or deposition). The chromium film 16 partially flows into the concave sections 15 and reaches the other major surface S2A of the ferroelectric substrate 11. Further, a gold film 17 is formed entirely on the chromium film 16 by sputtering (or deposition) (FIG. 3B). The gold film 17 gets electrically connected via the chromium film 16 in this manner on the ferroelectric substrate 11 which will be polarization-reversed. The regions where the gold film 17 electrically is connected with the ferroelectric substrate 11 via the chromium film 16 is periodically patterned by the resist layer 15, and the chromium film 16 and the gold film 17 function as the "pattern electrode" of the invention. In addition, a resist layer 18 for protection is applied to the exposed sections (namely, the ferroelectric substrate 11, the resist layer 15 and the gold film 17) within the other major surface S2A of the ferroelectric substrate 11 (FIG. 3C).

By the so-called voltage application method, the polarization at the regions which correspond to the concave sections 15a of the resist layer 15 within the ferroelectric substrate 11 are then reversed. According to this embodiment, in a condition that a structure 10 shown in FIG. 3C is immersed in a processing container TB which holds silicon oil, probes PB1 and PB2 are electrically connected respectively with the gold film 17 on the ferroelectric substrate 11 and the gold film 13c of the junction 13, and as a high-voltage source PS applies a high voltage between the probes PB1 and PB2, an electric field is generated between the pattern electrode (the chromium film 16 and the gold film 17) and the junction 13 and a periodic domain inverted region 11b is formed in the ferroelectric crystals of the ferroelectric substrate 11 (FIGS. 4A and 4B). The periodically poled structure is formed in the ferroelectric substrate 11. After forming the periodically poled structure, the optical device 1A is took out from the processing container TB, and the resist layer 15, the chromium 16, the gold film 17 and the protection resist layer 18 are removed from the other major surface S2A of the ferroelectric substrate 11. The optical device 1A shown in FIG. 1 is obtained in this fashion.

As described above, according to the first embodiment of the invention, the ferroelectric substrate 11 of single-polarization ferroelectric crystals, while being supported by the support plate 14 which is thicker than the ferroelectric substrate 11, is integrated with the support plate 14 by letting the insulation layer 12 and junction 13 mediate between one major surface S1A of the ferroelectric substrate 11 and one major surface S1B of the support plate 14, and therefore, it is possible to firmly support and fix the ferroelectric crystals despite thinning of the ferroelectric substrate 11, namely, the ferroelectric crystals, through the flat surface polishing described above. Hence, it is possible according to the first embodiment to perform thinning of the ferroelectric crystals down to the thickness of approximately 0.1 μm through 200 μm.

Further, since the junction 13 is formed by joining the first metal layer (the chromium film 13a+the gold film 13b) formed on one major surface S1A of the ferroelectric substrate 11 with the second metal layer (gold film 13c+the chromium film 13d) formed on one major surface S1B of the support plate 14, it is possible to firmly bond and integrate the ferroelectric substrate 11 with the support plate 14.

Further, since the insulation layer 12 exists between one major surface S1A of the ferroelectric substrate 11 and the junction 13, it is possible to form the periodically poled structure without fail by the voltage application method as shown in FIGS. 4A and 4B. In short, although being highly resistant against optical damage by doped MgO, the ferroelectric substrate 11 formed by a single crystal substrate of MgO:LN or MgO:SLT gives rise to a very small leak current when provided with a voltage even though the ferroelectric substrate 11 is a dielectric, which makes it impossible to form the domain inverted region 11b by the voltage application method. Noting this, the insulation layer 12 is formed, thereby suppressing development of the leak current and ensuring formation of the domain inverted region 11b in the ferroelectric substrate 11.

Further, according to the first embodiment, since the periodically poled structure is formed by the voltage application method after thinning the ferroelectric substrate 11, it is possible to shorten the domain-inverted period and obtain the high-resolution highly accurate domain inverted structure. This is because the depth of polarization which can be realized is determined in accordance with the poling period when the periodically poled structure is formed by the voltage application method. That is, where the poling period is A and the depth is d, processing is possible as long as the ratio d/A remains up to 50 and the lower the ratio is, the higher the accuracy of the processing is. Further, when the thickness of the ferroelectric crystals is 150 μm or thicker, the mechanical strength of the ferroelectric crystals is sufficiently maintained, a voltage can be applied without difficulty upon the electrode ("the junction 13" according to the embodiment above) disposed on one major surface S1A and the electrode (the pattern electrode (formed by the chromium film 16 and the gold film 17) according to the embodiment above) disposed on the other major surface S2A, and periodic polarization of the period A of approximately 3 μm is possible. Hence, as the ferroelectric substrate 11 becomes progressively thinner, the domain-inverted period can be further shortened because of the relationship between the period and the depth described above and the processing accuracy can be improved. Application of the optical device 1A which has such characteristics to an optical modulator, a wavelength conversion device and the like achieves a unique and excellent effect. This will be described in detail later under the section "Optical Modulator Using Optical Device" and the section "Wavelength Conversion Element Using Optical Device."

As described above, in the first embodiment, the arrangement pattern of the concave sections 15a formed in the resist layer 15 corresponds to "the periodic pattern" of the invention. Meanwhile, the insulation layer 12 corresponds to "the first insulation layer" of the invention.

In other words, the optical device according to this embodiment comprises: a ferroelectric substrate formed by ferroelectric crystals having a periodically poled structure; a support plate which is thicker than the ferroelectric substrate; and a junction, held between one major surface of the ferroelectric substrate and one major surface of the support plate opposed to one major surface of the ferroelectric substrate, and which integrates the ferroelectric substrate with the support plate to support the ferroelectric substrate with the support plate.

A manufacturing method of optical device according to this embodiment comprises: a first step of integrating a ferroelectric substrate formed by ferroelectric crystals with a support plate which is thicker than the ferroelectric substrate to support the ferroelectric substrate with the support plate by a conductive junction between one major surface of the ferroelectric substrate and one major surface of the support plate; a second step of forming a pattern electrode which has a periodic pattern on the other major surface of the ferroelectric substrate; and a third step of applying a voltage between the pattern electrode and the junction and forming a periodic domain inverted region in the ferroelectric substrate.

According to the embodiment, since the ferroelectric substrate having the periodically poled structure is supported by the support plate via the junction, it is possible to thin the ferroelectric crystals having the periodically poled structure. And it is possible to manufacture the periodically poled structure at a high accuracy. Hence, when an optical modulator is fabricated using the optical device described above for instance, since the crystal thickness of the ferroelectric crystals having the periodically poled structure is thin, the distance between the electrodes is short, the driving voltage can be suppressed low, and high-speed modulation is therefore possible. Meanwhile, in the case of a wavelength conversion device which uses the optical device described above for example, fabrication of domain inverted structure having a short period is possible because of thinning of ferroelectric crystals, which realizes further shortening of the conversion wavelength. Further, since the highly accurate periodically poled structure, that is, the periodically poled structure which is uniform with little variations of the period is obtained, it is possible to improve the conversion efficiency. In addition, safe work is possible since it is possible to reduce the applied voltage which is for forming the periodically poled structure.

According to the embodiment, the junction is a conductive layer which has a first metal layer and a second metal layer joined to the first metal layer, the first metal layer being formed on one major surface of the ferroelectric substrate, the second metal layer being formed on one major surface of the support plate and is joined to the first metal layer. Therefore it is possible to increase the bonding strength between the ferroelectric substrate and the support plate.

Further, with a first insulation layer which is disposed between one major surface of the ferroelectric substrate and the junction, it is possible to prevent a leak current from flowing between the ferroelectric substrate and the junction. This is particularly advantageous for formation of the periodically poled structure by the so-called electric field application method. The effect is as described in detail above.

Although the material, the structure and the like of the support plate can be chosen as desired, the support plate may be formed by the same liquid crystals as the ferroelectric crystals of the ferroelectric substrate, or the support plate may be formed so that a crystal orientation of the liquid crystals of the support plate coincides with a crystal orientation of the ferroelectric crystals of the ferroelectric substrate.

Considering application of the optical device to an optical modulator, a wavelength conversion device, etc., the thickness of 0.1 μm through 200 μm is preferable for the ferroelectric crystals of the ferroelectric substrate.

As described above, according to the embodiment, the ferroelectric substrate formed by ferroelectric crystals is bonded with the support plate by the junction and the periodically poled structure is formed in the ferroelectric substrate. Thinning of the ferroelectric crystals is therefore possible, and in addition, the highly accurate periodically poled structure can be obtained.

Second Embodiment

Figure 5A:
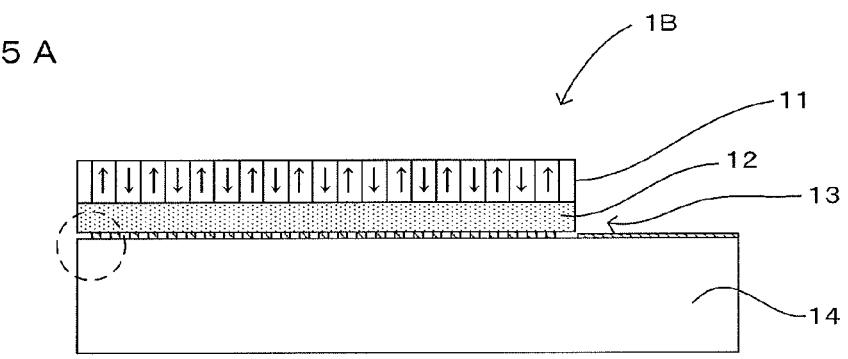
FIGS. 5A and 5B are cross sectional views which show a second embodiment of the optical device according to the invention.
Figure 5B:
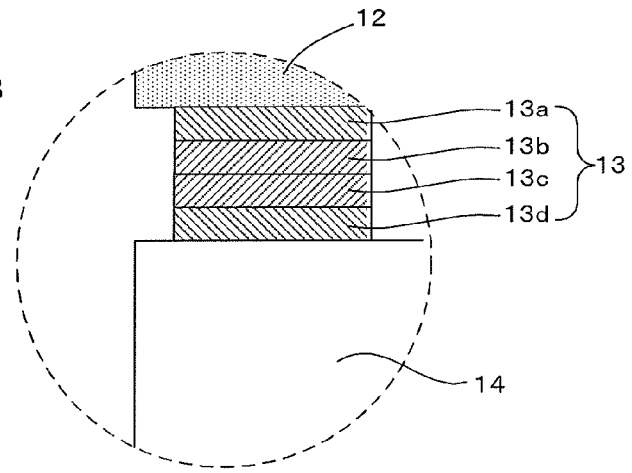
Figure 6A:
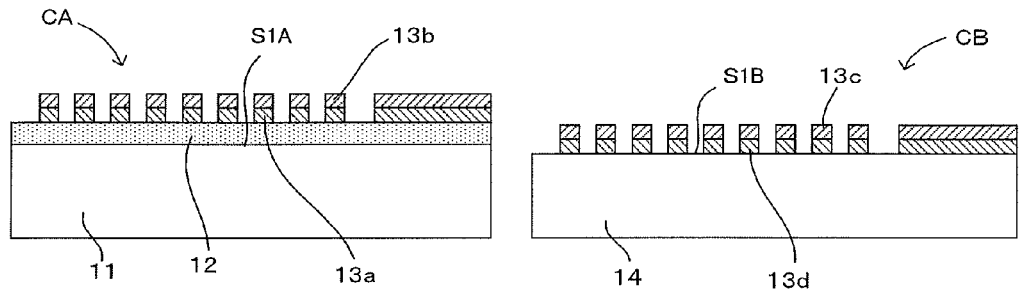
FIGS. 6A through 6C are schematic diagrams of the manufacturing method of the optical device shown in FIGS. 5A and 5B.
Figure 6B:
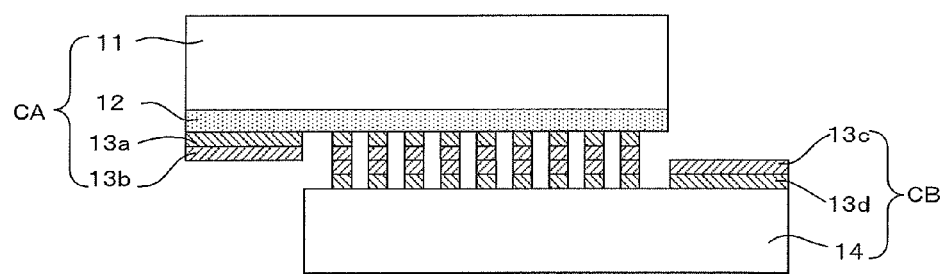
Figure 6C:
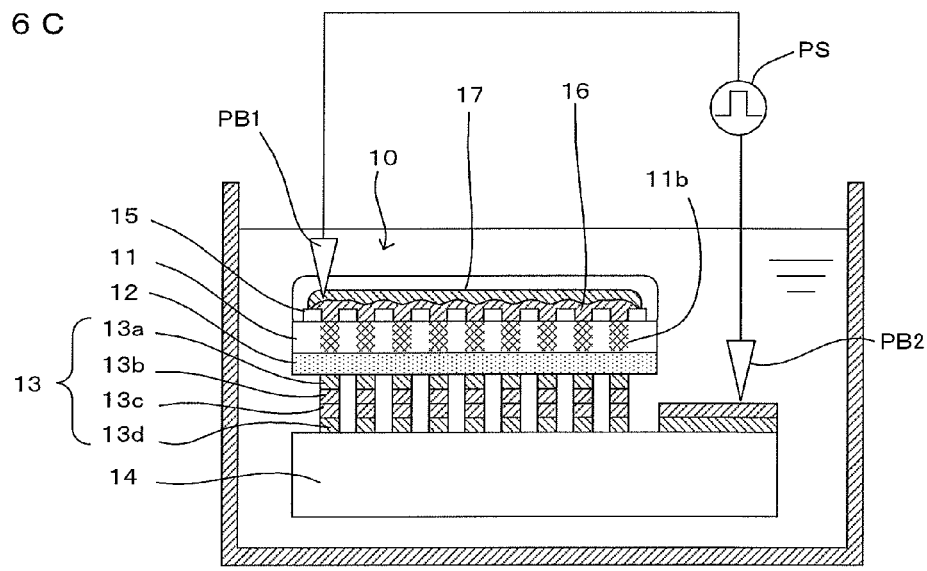

FIGS. 5A and 5B are cross sectional views which show a second embodiment of the optical device according to the invention. FIG. 5A shows the overall structure, and FIG. 5B is an enlarged schematic diagram of the section enclosed by the dotted line in FIG. 5A. FIGS. 6A through 6C are schematic diagrams of the manufacturing method of the optical device shown in FIGS. 5A and 5B, but show only characteristic steps of the manufacturing method according to the second embodiment. A major difference of the second embodiment from the first embodiment is the structure of the junction 13, and the other structures remain the same as those according to the first embodiment. Therefore, redundant descriptions will be omitted on the same structures which will instead be denoted at the same reference symbols.

In the second embodiment, the chromium film 13a and the gold film 13b forming the first metal layer are patterned in the arrangement pattern of the concave sections 15a formed in the resist layer 15, i.e., in the pattern of the domain inverted region 11b. Meanwhile, the gold film 13c and the chromium film 13d forming the second metal layer are patterned, in a similar fashion to that of the first metal layer, except within the area in which the chip CA is not superimposed on the chip CB (i.e., the right-hand side area in FIGS. 5A through 6C). The both metal layers are bonded in such a manner that the patterned gold films 13b and 13c are paired as shown in FIG. 5B, thereby forming the junction 13. The manufacturing method of the optical device 1B shown in FIGS. 5A and 5B will now be described with reference to FIGS. 6A through 6C. While the size of the junction 13 in FIGS. 6A through 6C is greatly different from that shown in FIGS. 5A and 5B, this is merely for clarification of the manufacturing method of the optical device 1B shown in FIGS. 5A and 5B: the structure of the junction 13 is enlarged vis-à-vis the other structures, and therefore, the structure of the junction 13 remains substantially unchanged from that shown in FIGS. 5A and 5B.

As in the first embodiment, the insulation film 12, the chromium film 13a and the gold film 13b are formed on one major surface S1A of the ferroelectric substrate 11 on the chip CA side, whereas the chromium film 13d and the gold film 13c are formed on one major surface S1B of the support plate 14 on the chip CB side in the second embodiment as well. Following this, using a positive pattern matching with the pattern of the domain inverted region 11b, by the photolithographic method, the chromium film 13a and the gold film 13b are formed in the chip CA while the chromium film 13d and the gold film 13c are formed on the one major surface S1B of the chip CB (FIG. 6A). Of the chromium film 13d and the gold film 13c at least which are located on the chip CB side, the segment-with-pattern (the left-hand side region in FIG. 5A) which is patterned and the segment-without-pattern (the right-hand side region in FIG. 5A) which is left as a film without getting patterned are electrically connected with each other, and therefore, as a predetermined electric potential is applied upon the segment-without-pattern with the probe PB2 contacting the segment-without-pattern as described later, the segment-with-pattern has the same electric potential as the segment without pattern.

After activating the chip surfaces with the fast atom bean of argon irradiated upon the patterned gold films 13b and 13c, the chip CA is reversed upside down, and while positioning the gold films 13b and 13c having the same pattern opposed to each other as a pair, the gold films 13b and 13c are tightly adhered to each other, and the chip CA is laid on top of the chip CB and bonded with the chip CB (FIG. 6B). The quadruple-layer junction 13 is formed by this FAB bonding, whereby the chips CA and CB are integrated with each other.

As in the first embodiment, after thinning by flat surface polishing and removal of the end of the chip CA, the patterned resist layer 15, the chromium film 16 and the gold film 17 are formed, thereby forming the pattern electrode. Further, the protection resist layer 18 is applied. In a condition that thus formed structure 10 is immersed in the processing container TB which holds silicon oil as shown in FIG. 6C, the probes PB1 and PB2 are electrically connected respectively with the gold film 17 which is on the ferroelectric substrate 11 and the segment-without-pattern of the gold film 13c, and as the high-voltage source PS applies a voltage between the probes PB1 and PB2, an electric field is generated between the pattern electrode (the chromium film 16 and the gold film 17) and the junction 13 and the periodic domain inverted region 11b is formed in the ferroelectric crystals of the ferroelectric substrate 11.

As described above, as in the first embodiment, also in the optical device 1B according to the second embodiment, the ferroelectric substrate 11 is integrated, while being supported by the support plate 14 which is thicker than the ferroelectric substrate 11, with the support plate 14 by letting the patterned junction 13 mediate between one major surface S1A of the ferroelectric substrate 11 and one major surface S1B of the support plate 14, and therefore, it is possible to perform thinning of the ferroelectric substrate 11, namely, the ferroelectric crystals, through the flat surface polishing described above. Further, since the junction 13 is patterned to match with the pattern of the domain inverted region 11b, the following effect is obtained. That is, when the voltage is applied, the favorable domain inverted region is formed as the electric flux lines act linearly upon the ferroelectric crystals of the ferroelectric substrate 1.

Although the insulation layer 12 is formed on one major surface S1A of the ferroelectric substrate 11 according to the first and the second embodiments described above, an insulation layer may be formed on the other major surface S2A of the ferroelectric substrate 11 which forms the optical device shown in FIGS. 1, 5A and 5B and the ferroelectric substrate 11 may be held between these two insulation layers, thereby forming a waveguide of the so-called step index type. As this allows propagation of light while containing the light inside the waveguide, it is possible to reduce light loss inside the ferroelectric substrate 11. Alternatively, a proton exchanged waveguide may be disposed on a portion in the thickness direction which is from the other major surface S2A toward one major surface S1A of the ferroelectric substrate 11. As this contains light inside the waveguide and makes the light propagate, it is possible to reduce loss of the light inside the ferroelectric substrate 11 as described above.

In other words, as indicated by this embodiment, the second insulation layer may be formed on the other major surface of the ferroelectric substrate whose one major surface seats the first insulation layer as described above. In this case, the area located between these two insulation layers becomes a waveguide of the step index type. Alternatively, a proton exchanged waveguide may be formed in the vicinity of at least one of one major surface of the ferroelectric substrate and the other major surface of the ferroelectric substrate.

Further, although the optical device 1A or 1B is formed using the ferroelectric substrate 11 which is formed by a single crystal substrate of MgO:LN or MgO:SLT according to the first or the second embodiment described above, the ferroelectric substrate 11 may be made of lithium tantalite added with magnesium oxide (MgO:lithium tantalate) or stoichiometric lithium niobate added with magnesium oxide (MgO:stoichiometric lithium niobate).

Alternatively, the ferroelectric substrate 11 may be made of lithium tantalite not added with magnesium oxide (MgO), stoichiometric lithium tantalate not added with magnesium oxide, lithium niobate not added with magnesium oxide, or stoichiometric lithium niobate not added with magnesium oxide. Further alternatively, a proton exchanged waveguide may be disposed in the vicinity of at least one of one major surface S1A and the other major surface S2A of the ferroelectric substrate 11, for reduction of light loss inside the ferroelectric substrate 11. However, according to these embodiments, since MgO is not added, a leak current will not be generated even when a high voltage is applied while forming the periodically poled structure, it is not necessary to form the insulation layer 12. The other structures and the manufacturing method remain the same.

Third Embodiment

Figure 7A:
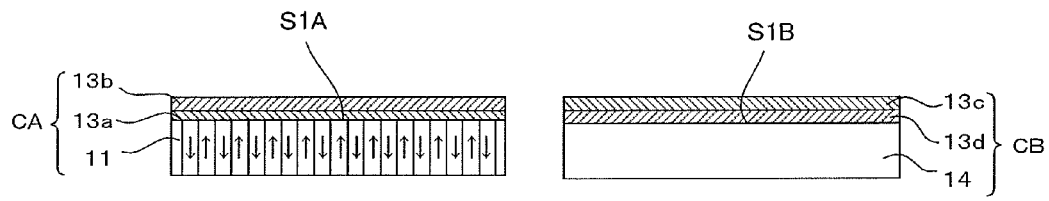
FIGS. 7A through 7D are cross sectional views which show a third embodiment of the optical device according the invention.
Figure 7B:
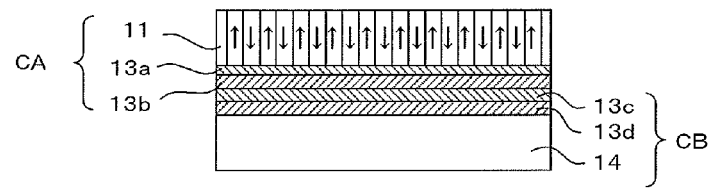
Figure 7C:
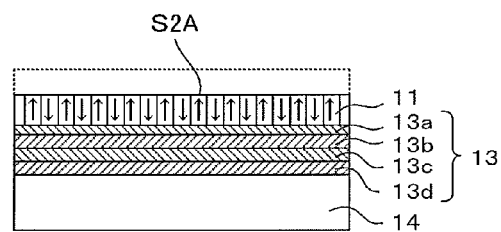
Figure 7D:
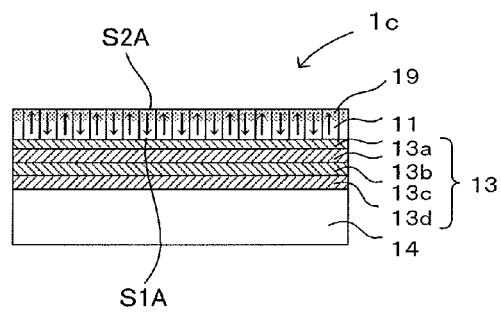

FIGS. 7A through 7D are cross sectional views which show a third embodiment of the optical device according the invention. The optical device 1C according to the third embodiment is integration of the ferroelectric substrate 11 formed by ferroelectric crystals having periodically poled structure and the support plate 14, which is thicker than the ferroelectric substrate 11, via the quadruple-layer junction 13 as shown in FIG. 7D, and is manufactured in the following manner.

The third embodiment requires preparing the ferroelectric substrate 11 formed by ferroelectric crystals having periodically poled structure and the support plate 14. As in the first and the second embodiments, the support plate 14 has the same composition as that of the ferroelectric substrate 11 and is formed by ferroelectric crystals having the same absolute value of the crystal orientation as that of the ferroelectric substrate 11 according to the third embodiment. Through sputtering or deposition, the chromium film 13a and the gold film 13b are formed one atop the other in this order on one major surface S1A of the ferroelectric substrate 11, thereby forming the first metal layer, and the chromium film 13d and the gold film 13c are formed one atop the other in this order on one major surface S1B of the support plate 14, thereby forming the second metal layer (FIG. 7A).

A fast atom beam of argon is then irradiated upon the gold films 13b and 13c and the chip surfaces are activated. Further, after inverting the chip CA formed by the ferroelectric substrate 11 and the first metal layer upside down, the chip CA is disposed on top of and bonded with the chip CB which is formed by the support plate 14 and the second metal layer (FIG. 7B). By this FAB bonding, the quadruple-layer junction 13 is formed, and the chips CA and CB are integrated with each other. According to the third embodiment, the both chips CA and CB are laid one atop the other such that they match exactly with each other.

Flat surface polishing is then performed on the other major surface of the chip CA thus integrated with the chip CB, namely, the other major surface S2A of the ferroelectric substrate 11, which achieves thinning of the ferroelectric substrate 11 down to a desired thickness (the thickness of 0.1 μm through 200 μm) (FIG. 7C). Further, a proton exchanged waveguide 19 is disposed on a portion in the thickness direction which is from the other major surface S2A toward one major surface S1A of the ferroelectric substrate 11, in an effort to let light propagate through the ferroelectric substrate 11 while containing the light inside the waveguide 19 and reduce light loss. The optical device 1C thus manufactured is the third embodiment of the invention.

As described above, as in the first embodiment, according to the third embodiment as well, the ferroelectric substrate 11, while being supported by the support plate 14 which is thicker than the ferroelectric substrate 11, is integrated with the support plate 14 by letting the junction 13 mediate between one major surface S1A of the ferroelectric substrate 11 and one major surface S1B of the support plate 14, which realizes thinning of the ferroelectric substrate 11, namely, the ferroelectric crystals by the flat surface polishing described above.

In other words, the method of manufacturing optical device according to this embodiment comprises a first step of integrating a ferroelectric substrate with a support plate to support ferroelectric substrate with a support plate by a conductive junction between one major surface of the ferroelectric substrate and one major surface of the support plate, the ferroelectric substrate being formed by ferroelectric crystal having a periodically poled structure, the support plate being thicker than the ferroelectric substrate.

According to the embodiment, since the ferroelectric substrate having the periodically poled structure is supported by the support plate via the junction, it is possible to thin the ferroelectric crystals having the periodically poled structure. And it is possible to manufacture the periodically poled structure at a high accuracy. Hence, when an optical modulator is fabricated using the optical device described above for instance, since the crystal thickness of the ferroelectric crystals having the periodically poled structure is thin, the distance between the electrodes is short, the driving voltage can be suppressed low, and high-speed modulation is therefore possible. Meanwhile, in the case of a wavelength conversion device which uses the optical device described above for example, fabrication of domain inverted structure having a short period is possible because of thinning of ferroelectric crystals, which realizes further shortening of the conversion wavelength. Further, since the highly accurate periodically poled structure, that is, the periodically poled structure which is uniform with little variations of the period is obtained, it is possible to improve the conversion efficiency. In addition, safe work is possible since it is possible to reduce the applied voltage which is for forming the periodically poled structure.

Fourth Embodiment

FIGS. 8A through 8D are cross sectional views which show a fourth embodiment of the optical device according to the invention. A major difference of the optical device 1D according to the fourth embodiment from the third embodiment is the waveguide. That is, in the fourth embodiment, as the ferroelectric substrate 11 formed by ferroelectric crystals having periodically poled structure is held between insulation layers made of SiO$_2$ or the like, the waveguide of the step index type is formed. The other structures and the effect are the same as those according to the third embodiment. The manufacturing method of the optical device 1D will now be described with reference to FIGS. 8A through 8D.

Figure 8A:
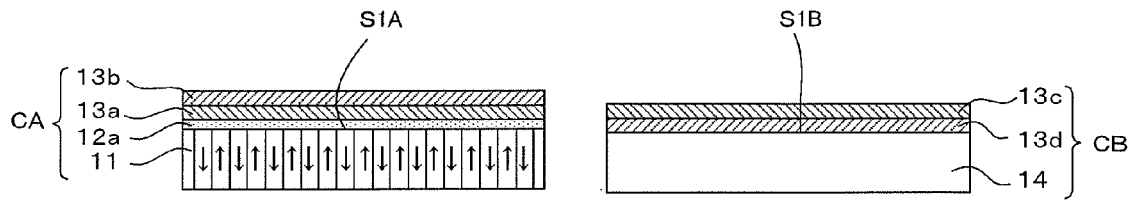
FIGS. 8A through 8D are cross sectional views which show a fourth embodiment of the optical device according to the invention.

The fourth embodiment requires preparing the ferroelectric substrate 11 formed by ferroelectric crystals having periodically poled structure and the support plate 14. As for the ferroelectric substrate 11, after forming an insulation layer 12a of $SiO_2$ by sputtering on one major surface S1A, through sputtering or deposition, the chromium film 13a and the gold film 13b are formed one atop the other in this order on the insulation layer 12a, thereby forming the first metal layer. Meanwhile, in a similar manner to that in the third embodiment, the chromium film 13d and the gold film 13c are formed one atop the other in this order on one major surface S1B of the support plate 14, thereby forming the second metal layer (FIG. 8A).

Figure 8B:
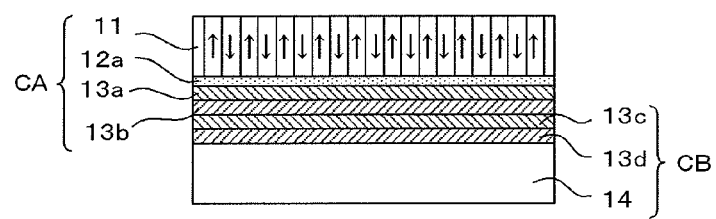

Following this, as in the third embodiment, a fast atom beam of argon is irradiated upon the gold films 13b and 13c and the chip surfaces are activated, the chip CA formed by the ferroelectric substrate 11, the insulation layer 12a and the first metal layer is then inversed upside down, and the chip CA is disposed on top of and accordingly bonded with the chip CB which is formed by the support plate 14 and the second metal layer (FIG. 8B). The quadruple-layer junction 13 is formed as a result of this FAB bonding, whereby the chips CA and CB are integrated with each other.

Figure 8C:
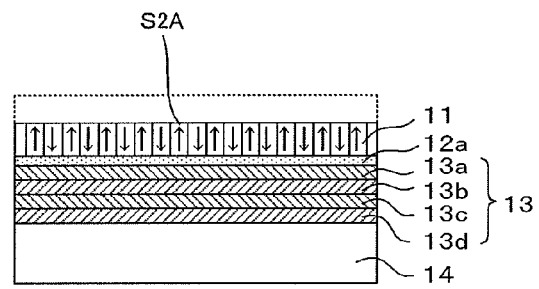
Figure 8D:
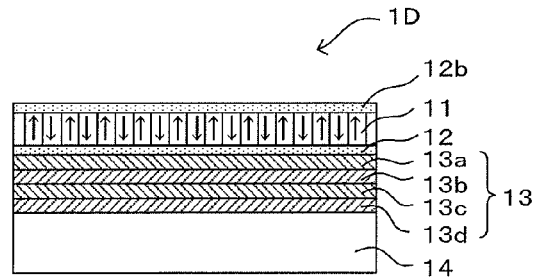

The other major surface S2A of the ferroelectric substrate 11 is then polished by flat surface polishing, thereby thinning the ferroelectric substrate 11 down to a desired thickness (the thickness of 0.1 μm through 200 μm) (FIG. 8C). Further, by sputtering, an insulation layer 12b of $SiO_2$ is deposited on the other major surface S2A of the ferroelectric substrate 11 which is polished, and a waveguide of the step index type is formed (FIG. 8D). The optical device 1D thus manufactured is the fourth embodiment of the invention.

Fifth Embodiment

Figure 9A:
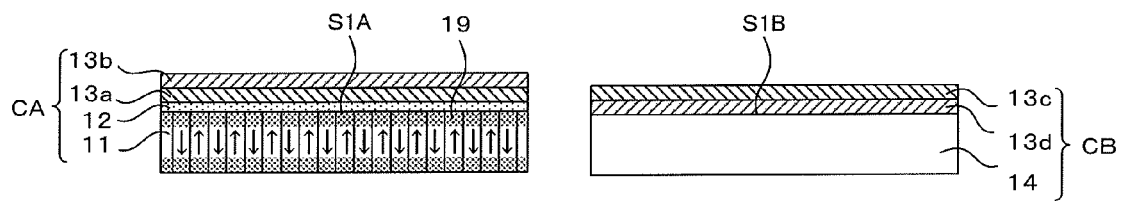
FIGS. 9A through 9C are cross sectional views which show a fifth embodiment of the optical device according to the invention.
Figure 9B:
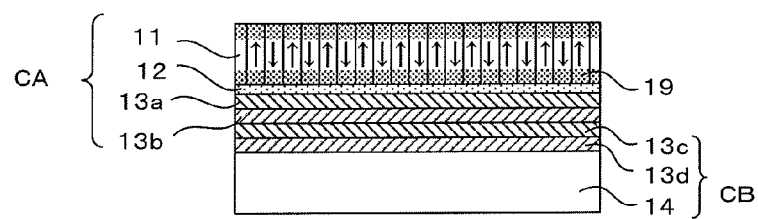
Figure 9C:
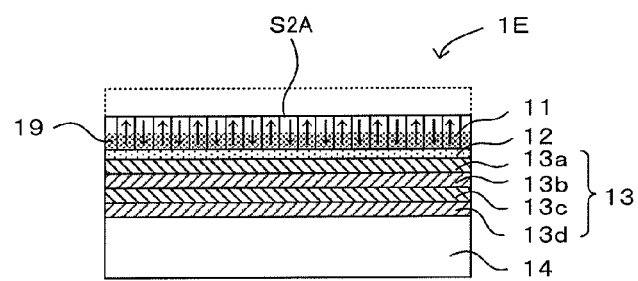

FIGS. 9A through 9C are cross sectional views which show a fifth embodiment of the optical device according to the invention. A major difference of the optical device 1E according to the fifth embodiment from the fourth embodiment is a configuration of the waveguide. That is, the fifth embodiment requires, prior to bonding of the ferroelectric substrate 11 and the support plate 14, forming the proton exchanged waveguide 19 on a portion in the thickness direction which is from the other major surface S2A toward one major surface S1A of the ferroelectric substrate 11, so that the proton exchanged waveguide 19 remains in the ferroelectric substrate 11 even after thinning of the ferroelectric substrate 11 by flat surface polishing of post-bonding. The other structures and the effect are the same as those according to the third and the fourth embodiments. The manufacturing method of the optical device 1E will now be described with reference to FIGS. 9A through 9C.

The fifth embodiment requires preparing the support plate 14 and the ferroelectric substrate 11 formed by ferroelectric crystals which has periodically poled structure and is provided with the proton exchanged waveguide 19 in the vicinity of at least one major surface S1A. Following this, as in the fourth embodiment, the insulation layer 12a, the chromium film 13a and the gold film 13b are formed one atop the other in this order on one major surface S1A of the ferroelectric substrate 11, thereby forming the first metal layer, and the chromium film 13d and the gold film 13c are formed one atop the other in this order on one major surface S1B of the support plate 14, thereby forming the second metal layer (FIG. 9A).

Following this, as in the embodiments above, a fast atom beam of argon is irradiated upon the gold films 13b and 13c and the chip surfaces are activated, the chip CA formed by the ferroelectric substrate 11, the insulation layer 12a and the first metal layer is then reversed upside down, and the chip CA is disposed on top of and accordingly bonded with the chip CB which is formed by the support plate 14 and the second metal layer (FIG. 9B). The quadruple-layer junction 13 is formed as a result of this FAB bonding, whereby the chips CA and CB are integrated with each other. The other major surface S2A of the ferroelectric substrate 11 is then polished by flat surface polishing, thereby thinning the ferroelectric substrate 11 down to a desired thickness (the thickness of 0.1 μm through 200 μm) (FIG. 9C). The optical device 1E thus manufactured is the fifth embodiment of the invention.

<Optical Modulator Using Optical Device>

The optical device according to the invention, due to the characteristics described above, realizes an excellent effect when applied to an optical modulator. The structure and operation of the optical modulator to which the optical device 1A shown in FIG. 1 for instance is applied will now be described while describing an exposure apparatus and a pattern drawing apparatus equipped with the optical modulator.

Figure 10:
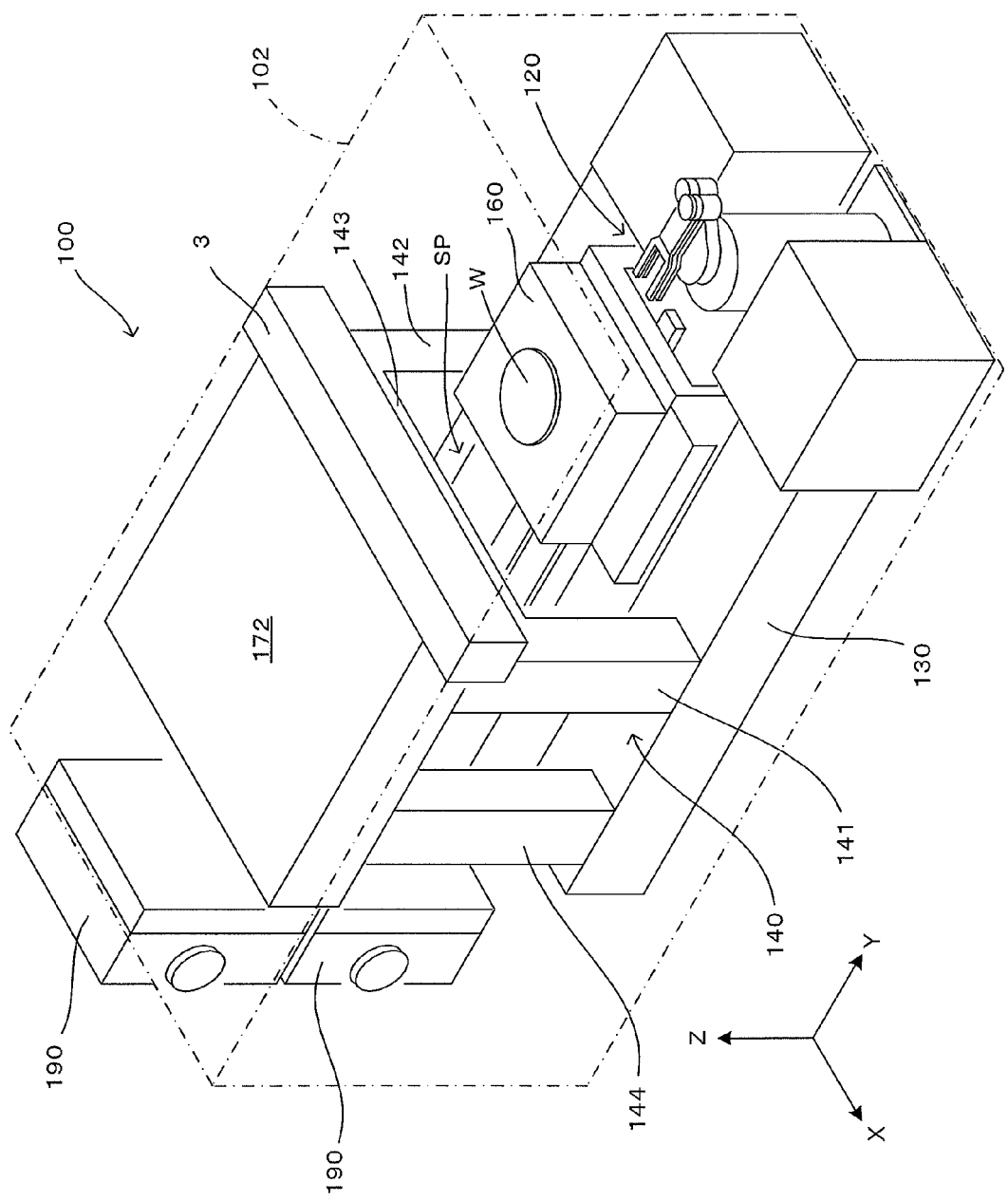
FIG. 10 is a perspective view of a pattern drawing apparatus comprising an optical modulator to which the optical device according to the invention is applied.
Figure 11:
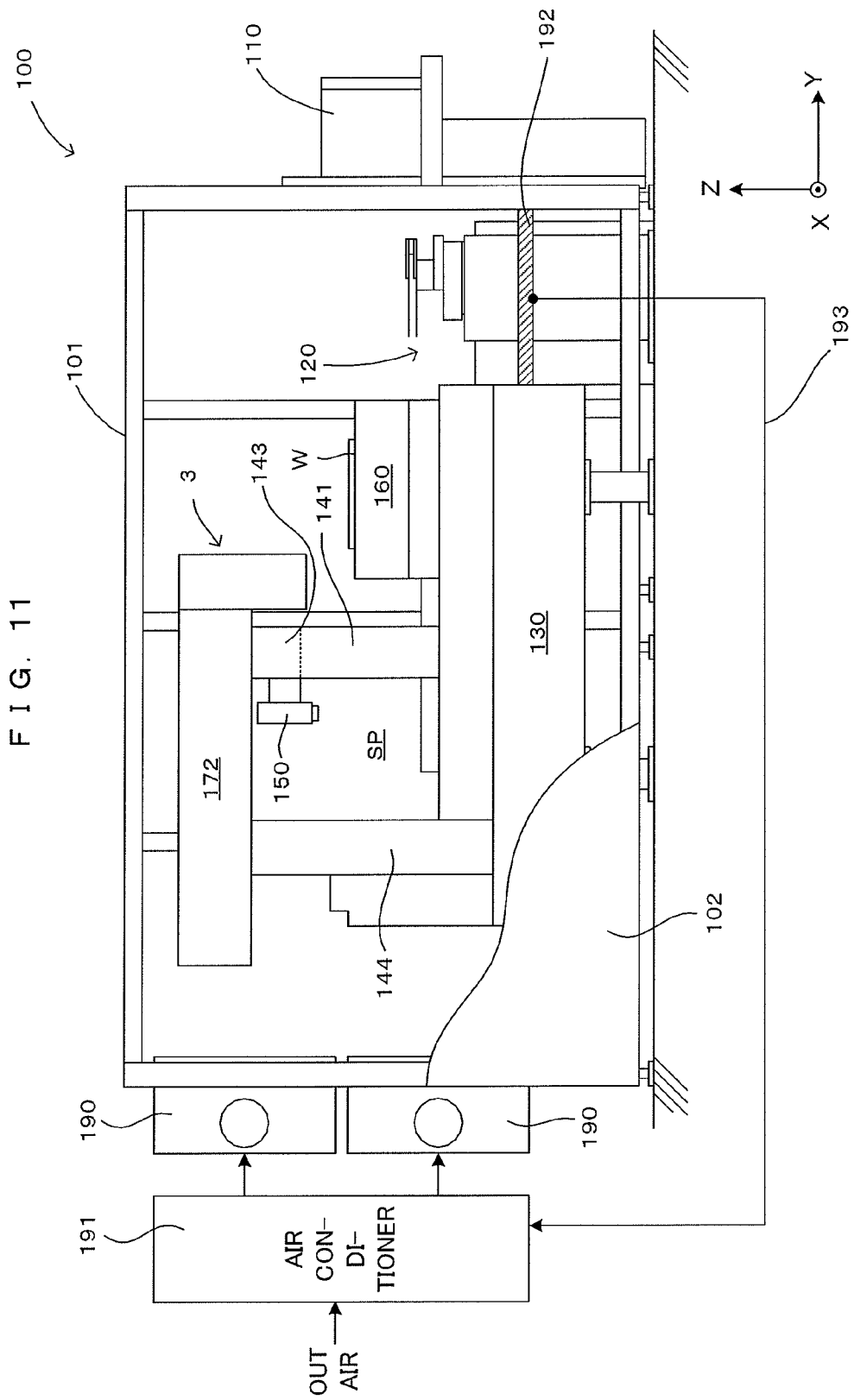
FIG. 11 is a side view of the pattern drawing apparatus of FIG. 10.

FIG. 10 is a perspective view of a pattern drawing apparatus comprising an optical modulator to which the optical device according to the invention is applied, FIG. 11 is a side view of the pattern drawing apparatus of FIG. 10, and FIG. 12 is a block diagram which shows the electric structure of the pattern drawing apparatus of FIG. 10. This pattern drawing apparatus 100 is an apparatus which draws a pattern with irradiation of light upon the surface of a substrate W such as a semiconductor substrate and a glass substrate whose surface is provided with a photosensitive material.

As for the pattern drawing apparatus 100, parts of apparatus are disposed inside a main unit which has a main unit frame 101 and cover 102 attached to the main unit frame 101, thereby forming the main unit, and a substrate housing cassette 110 is disposed outside the main unit (i.e., on the right-hand side to the main unit portion according to this embodiment as shown in FIG. 11). The substrate housing cassette 110 houses an unprocessed substrate W to be exposed, and a transportation robot 120 which is disposed inside the main unit loads the unprocessed substrate W into the main unit. After exposure (pattern drawing processing) of the unprocessed substrate W, the transportation robot 120 unloads the substrate W from the main unit and returns it back to the substrate housing cassette 110.

In the main unit, the transportation robot 120 is disposed at the far-right end inside the main unit which is enclosed by the cover 102 as shown in FIGS. 10 and 11. In addition, a base 130 is disposed on the left-hand side to the transportation robot 120. An area of the base 130 toward one end of the base 130 (the right-hand side area in FIGS. 10 and 11) serves as a substrate transfer area for transferring the substrate W with the transportation robot 120, whereas an area toward the other end of the base 130 (the left-hand side area in FIGS. 10 and 11) serves as a pattern drawing area for drawing a pattern on the substrate W. On the base 130, there is a head support 140 at a position over the boundary between the substrate transfer area and the pattern drawing area. At the head support 140, two leg members 141 and 142 are disposed upright toward above from the base 130, and a beam member 143 is disposed as if to bridge the top portions of the leg members 141 and 142. A camera (imaging part) 150 is fixed to a pattern-drawing-area side surface of the beam member 143 so that it is possible to shoot the surface of the substrate W (i.e., the surface to be drawn, the surface-to-be-exposed) which is held by a stage 160, as shown in FIG. 11.

A stage moving mechanism 161 makes the stage 160 move on the base 130 in the X-direction, the Y-direction and the θ-direction. That is, a Y-axis driver 161Y (FIG. 12), an X-axis driver 161X (FIG. 12) and a θ-axis driver 161T (FIG. 12) are disposed one atop the other in this order on the top surface of the base 130, forming the stage moving mechanism 161 which moves the stage 160 in two-dimensional directions within a horizontal plane and positions the stage 160. Further, the stage moving mechanism 161 rotates the stage 160 about the θ-axis (vertical axis), adjusts the angle relative to an optical head 3 which will be described later, and positions the stage 160. Such a stage moving mechanism 161 may be an X-Y-θ-axis moving mechanism which has customarily been often used.

The optical head 3 is fixed to a box 172 in the pattern drawing area side of the head support 140 having such a structure. The optical head 3, equipped with a spatial optical modulator using the optical device 1A according to the invention, irradiates light upon and exposes the substrate W, and as such, corresponds to the "exposure apparatus" of the invention. The structure and operation of the optical head 3 will be described in detail later.

At the opposite end of the base 130 to the substrate transfer side as well (the left-hand side end in FIGS. 10 and 11), there are two leg members 144 disposed upright. A box 172 housing the illumination optical system of the optical head 3 is disposed bridging the beam member 143 and the top portions of the two leg members 144, thereby covering the pattern drawing area of the base 130 from above. This defines a space SP which blocks a downflow from reaching the pattern drawing area even when the main unit accepts the downflow which is supplied into inside a clean room in which the pattern drawing apparatus 100 is installed.

In the pattern drawing apparatus 100 according to this embodiment, on the opposite side of the transportation robot to the space SP, there are gas blowers 190 for discharging temperature-controlled gas toward the space SP which is located between the stage 160 and the box 172 for the optical head 3. According to this embodiment, the two gas blowers 190 are provided one above the other, penetrating the cover 102 which forms the left-hand side wall of the main unit. Connected with an air conditioner 191, the gas blowers 190 operate in response to an instruction from an exposure controller 181 and blow out air which is temperature-controlled by the air conditioner 191 toward the space SP. This makes the temperature-controlled gas discharged from the gas blowers 190 flow sideways and move through the space SP. The atmosphere in the space SP is consequently replaced, which suppresses a temperature change within the pattern drawing area. While air flowing through the space SP flows into the transportation robot 120, according to this embodiment, there is an exhaust outlet 192 disposed below the transportation robot 120 and connected with the air conditioner 191 via a pipe 193. The existence of the exhaust outlet 192 exhausts the atmosphere surrounding the transportation robot 120, and creates an air flow toward below within the atmosphere, namely, a downflow. It is thus possible to effectively prevent the transportation robot 120 from stirring up and scattering particles.

The structure and operation of the optical head 3 (exposure apparatus) will now be described. In this embodiment, the optical head 3 is fixed to the box 172, and irradiates light from above the substrate W which moves right below the optical head 3, thereby the substrate W held by the stage 160 is exposed and a pattern is drawn on the substrate W. According to the embodiment, the optical head 3 is capable of irradiating light in a plurality of channels at the same time in the X-direction, and the X-direction corresponds to the "sub scanning direction." In addition, as the stage 160 moves in the Y-direction, a pattern is drawn to the substrate W in two-dimensional directions, and the Y-direction corresponds to the "main scanning direction."

FIGS. 13A and 13B are simplified views of the internal structure of the optical head. FIG. 13A shows the internal structure of the optical head 3 as it is viewed from above (i.e., from the (+Y)-side in FIG. 10) along the optical axis OA and the sub scanning direction X, while FIG. 13B shows the internal structure of the optical head 3 as it is viewed from the front side of the apparatus shown in FIG. 10 (the left-hand side bottom) along the main scanning direction Y (i.e., from the (−X)-side toward the (+X)-side of the optical head 3).

The optical head 3 shown in FIGS. 13A and 13B comprises a light source 31 which is formed by a semiconductor laser and the like which emits a light beam having a predetermined wavelength (which may for example be 830 nm, 635 nm, 405 nm or 355 nm). In the event that laser light of 355 nm is to be used, the light source is a solid laser source using a harmonic wave whose frequency is triple that of a YAG (Yttrium Aluminum Garnet) laser. The light source 31 comprises a collimator lens (not shown), and a light beam from the semiconductor laser becomes parallel light by the collimator lens and enters the illumination optical system 32 via a mirror not shown.

The illumination optical system 32 is formed by three cylindrical lenses 321 through 323, and a light beam from the light source 31 enters upon the spatial optical modulator 33 after going through the cylindrical lenses 321 through 323 in this order. Of the cylindrical lenses, the cylindrical lens 321 is capable of expanding a beam only in the X-direction (the negative condensing function), and when the luminous flux cross section of light through the cylindrical lens 321 is to be observed in the perpendicular direction to the optical axis OA, the cross section gradually changes from a circular shape to an oval shape which is long in the X-direction. Meanwhile, with respect to the Y-direction which is perpendicular to the optical axis OA and the X-direction, the width of the luminous flux cross section of the light through the cylindrical lens 321 is (approximately) constant. The cylindrical lens 322 has the positive condensing function only in the X-direction and shapes the light beam through the cylindrical lens 321. That is, light through the cylindrical lens 322 enters upon the cylindrical lens 323 while the luminous flux cross section of the light becomes an oval shape of a certain size which is long in the X-direction. The cylindrical lens 323 has the positive condensing function only in the Y-direction, and with respect to the Y-direction alone, light LI through the cylindrical lens 323 enters upon the incident surface 331a of the spatial optical modulator 33 while getting converged as shown in FIG. 13B. In the X-direction, the light beam from the cylindrical lens 323 enters upon the spatial optical modulator 33 as a parallel beam as shown in FIG. 13A.

The spatial optical modulator 33 comprises an optical modulation device 331 formed by the optical device 1A according to the first embodiment of the invention, an electrode substrate 332, an electric circuit board 336 and a modulation part 338 (FIG. 12) which develops an electric field within the ferroelectric substrate 11 of the optical modulation device 331 (the optical device 1A) and modulates light propagating through the ferroelectric crystals of the ferroelectric substrate 11.

FIGS. 14A and 14B show the spatial optical modulator. FIG. 14A is a partial cross sectional view of the spatial optical modulator viewed in the YZ plane, and FIG. 14B is a partial cross sectional view of the spatial optical modulator viewed in the XY plane. As shown in FIGS. 13 through 14B, the spatial optical modulator 33 has a wiring area Ra within the top major surface of the electrode substrate 332 and a mounting area Rb for mounting the optical modulation device 331 formed by the optical device 1A. A plurality of electrodes 333 extend in the Z-axis direction from the wiring area Ra to the mounting area Rb. More specifically, the (−Z)-side end of each electrode 333 extends in the Z-direction within the wiring area Ra and reaches the mounting area Rb. In the mounting area Rb, the (+Z)-side end of each electrode 333 extends in the Z-direction approximately in a parallel arrangement with each other. In this embodiment, the portions of the electrodes 333 located on the wiring area Ra, i.e., the (−Z)-side ends of the electrodes 333 are induced portions of inductive coupling described later and will hereinafter be referred to as "induced pattern portions." Meanwhile, the portions located on the mounting area Rb, i.e., the (+Z)-side ends of the electrodes 333 are opposed to the ferroelectric substrate 11 of the optical modulation device 331 and function as electrode portions for controlling the periodically poled structure, and therefore, these portions will hereinafter be referred to as "electrode portions."

A protection film 334 made of an insulation material such as $SiO_2$ is formed all over the top major surface of the electrode substrate 332, as if to cover the electrodes 333, so that the electrodes 333 are protected and the surface of the protection film 334 (the top major surface) is flattened. Within the mounting area Rb, the optical modulation device 331 is mounted at a position which corresponds to the mounting area Rb. The electrode portions of the electrodes 333 are opposed to the other major surface S2A of the ferroelectric substrate 11 via the protection film 334 as shown in FIGS. 14A and 14B.

In the optical modulation device 331, the junction 13 is provided via the insulation layer 12 as if to entirely cover one major surface S1A of the ferroelectric substrate 11. A ground electric potential is applied upon the junction 13 so as to use the optical device 1A as the optical modulation device 331. By inductive coupling via wires (not shown) formed on the top major surface of the electric circuit board 336, the modulation part 338 applies a voltage in accordance with light modulation upon each electrode 333.

The wires, which are formed by a conductive material and have the same shapes as the induced pattern portions, are formed in one-to-one correspondence to the induced pattern portions (i.e., the portions of the electrodes 333 located on the wiring area Ra) on the top major surface of the electric circuit board 336. This electrically connects the electrodes which are opposed to each other in one-to-one correspondence with each other due to inductive coupling. A plurality of electronic components 3381 which form the modulation part 338 are mounted on the bottom major surface of the electric circuit board 336 and electrically connected with the electrodes 333 via the electric circuit board 336, and respectively apply a voltage upon the electrodes 333 independently of each other in accordance with various signals and data supplied from the exposure controller 181 as described below.

As shown in FIG. 12, the modulation part 338 receives an exposure timing signal, an exposure position signal and exposure data from the exposure controller 181. The modulation part 338 comprises an analog circuit (not shown) for each electrode 333, i.e., for each channel, and applies the driving voltage (V1 or V0) based on the exposure data fed from the exposure controller 181. The exposure controller 181 controls the plurality of electrodes 333 (two or more neighboring electrodes 333 for instance) as one channel such that one channel is longer than the period of the periodically poled structure.

In the spatial optical modulator 33, the electrodes 333 which form the respective channels receive independently of each other the voltage from the modulation part 338 in accordance with the exposure data and the like provided from the exposure controller 181 as described above, whereas the junction 13 is grounded. Within the periodically poled structure of the optical modulation device 331, due to an electric field developing between the electrodes 333 and the junction 13 only at an area which corresponds to those electrodes 333 applied with the predetermined voltage V1 (which is an electric potential other than 0V) from the modulation part 338, the refractive index changes in accordance with the polarization orientation and a diffraction grating is created. As a result, diffracted light DL is created in these channels. On the contrary, in the other channels, the incident light passes through the optical modulation device 331 while remaining unchanged as zero-order light L0.

Referring back to FIGS. 13A and 13B, the structure of the optical head 3 will be continuously described. On the light injection side of the spatial optical modulator 33 which has the structure described above (i.e., on the right-hand side in FIGS. 13A and 13B), a cylindrical lens 34 which has the positive condensing function only in the Y-direction, a lens 351, an aperture plate 352 which has an aperture 3521, and a lens 353 are disposed in this order. The cylindrical lens 34 has the positive condensing function only in the Y-direction, and the cylindrical lens 34 changes the zero-order light L0 or the diffraction light DL from the spatial optical modulator 33 to approximately parallel light to the Y-direction and enters upon the lens 351 which has the positive condensing function as shown in FIG. 13D.

The front focal point of the lens 351 is at a position within the optical modulation device 331 in the vicinity of the (+Z)-side ends of the electrodes 333, and the aperture plate 352 is disposed such that the aperture 3521 is located at the back focal point of the lens 351. Hence, the zero-order light L0 passing through the lens 34 and becoming approximately parallel to both the X-direction and the Y-direction without getting diffracted inside the optical modulation device 331 is converged at the aperture 3521 via the lens 351 and enters upon the lens 353 after passing through the aperture 3521 as denoted at the thin solid line in FIG. 13A. The lens 353 is disposed in such a manner that the front focal point of the lens 353 is in the vicinity of the aperture 3521 and the back focal point of the lens 353 is located on the surface of the substrate W which is held by the stage 160, and the zero-order light L0 is irradiated upon the surface of the substrate W via the lens 353 and exposes the surface of the substrate W. Meanwhile, the diffraction light DL is emitted from the optical modulation device 331 as it is tilted at a predetermined angle with respect of the optical axis OA as denoted at the dotted line in FIG. 13A, and therefore, is blocked at a far position from the aperture 3521, i.e., by the surface of the aperture plate 352.

As described above, in this embodiment, the lens 351, the aperture plate 352 and the lens 353 form what is known as a "schlieren optical system" 35. The schlieren optical system 35 has an equivalent arrangement to that of a bilateral telecentric system, and as shown in FIGS. 13A and 13B, even when the optical head 3 having the plurality of channels exposes the substrate W, the principal ray of the zero-order light L0 in each channel (denoted at the chain double-dashed lines in FIGS. 13A and 13B) is perpendicular to the exposure surface (which is the surface of the substrate W) and the magnification ratio will not change even despite a change of the exposure surface in the focusing direction Z. This makes it possible to expose at a high accuracy. According to the first embodiment, a pattern is drawn on the substrate W using the zero-order light in this fashion. The lens 34 and the schlieren optical system 35 arranged as described above function as the "optical system" of the invention which guides the light from the spatial optical modulator 33 to the surface of the substrate W (the surface-to-be-exposed, the drawing surface).

The pattern drawing apparatus 100 having the structure described above comprises a computer 200 for control of the entire apparatus. The computer 200 comprises a CPU, a memory 201, etc., and is disposed together with the exposure controller 181 inside an electric component rack (not shown). As the CPU installed in the computer 200 performs computing in accordance with a predetermined program, a rasterizer 202, an expansion ratio calculator 203, a data corrector 204 and a data generator 205 are realized. For example, data regarding a pattern corresponding to one LSI are data generated by an external CAD or the like and made available in advance as LSI data 211 in the memory 201, so that the pattern of the LSI is drawn on the substrate W in the following manner based on the LSI data 211.

The rasterizer 202 divides and rasterizes a unit area indicated by the LSI data 211, and generates raster data 212 and saves the rater data 212 in the memory 201. After preparing the raster data 212 in this manner or in parallel to the preparation of the raster data 212, the transportation robot 120 unloads the unprocessed substrate W housed in the cassette 110 and sets the unprocessed substrate W on the stage 160.

The stage moving mechanism 161 then moves the stage 160 to a position right below a camera 150 and positions the stage 160 to such a position at which it is possible for the camera 150 to shoot alignment marks (reference marks) which are on the substrate W, and the camera 150 shoots the marks. An image processing circuit (not shown in FIG. 12) inside the electric component rack processes an image signal outputted from the camera 150, and therefore, the positions of the alignment marks on the stage 160 are accurately identified. The θ-axis driver 161T operates based on thus obtained position information, thereby slightly rotating the stage 160 about the vertical axis and aligning (positioning) the stage 160 to a direction which is appropriate for drawing of a pattern on the substrate W. This aligning action may be executed after moving the stage 160 to a position immediately below the optical head 3.

The expansion ratio calculator 203 shown in FIG. 12 acquires the positions of the alignment marks on the substrate W identified by the image processing circuit and the correction amount of the direction of the substrate W, and calculates post-alignment positions of the alignment marks and an expansion ratio of the substrate W (i.e., an expansion ratio of one major surface) in the main scanning direction Y and the sub scanning direction X.

Meanwhile, the data corrector 204 acquires the raster data 212 and corrects the data in accordance with the expansion ratio which is the detection result of expansion. The data correction may be done by the method described in the Japanese patent No. 4020248 for instance, and after data correction for one divided area, the post-correction raster data 212 are sent to the data generator 205. The data generator 205 generates drawing data corresponding to a post-change divided area, namely, data corresponding to one stripe.

Thus data generator 205 sends the generated drawing data to the exposure controller 181, and as the exposure controller 181 controls various portions of the modulation part 338, a head moving mechanism 171 and the stage moving mechanism 161, drawing for one stripe is realized. The exposing operation is performed through control of electric field development which is provided by the modulation part 338 as described above. Upon exposure and recording for one stripe, similar processing is executed for the next divided area, and drawing for one stripe is repeated. As drawing for all stripes on the substrate W ends and drawing of a desired pattern on the surface of the substrate W completes, the stage 160 moves to a substrate transfer position (the right-hand side area in FIGS. 10 and 11) while carrying the substrate W on which the pattern has been drawn, and after this, the transportation robot 120 returns the substrate W back to the cassette 110, the next substrate W is unloaded, and similar processing to the one described above is repeated. As pattern drawing on all substrates W housed in the cassette 110 ends, the cassette 110 is unloaded from the pattern drawing apparatus 100.

As described above, since the optical device 1A according to the first embodiment is used as it is as the optical modulation device 331 of the optical modulator 33 for the pattern drawing apparatus 100, the following effect is realized. That is, in the optical device 1A, since the periodically poled structure is thinner as compared to those according to the conventional techniques as described previously, the distances between the junction 13 and the respective electrodes 333 are shorter. Hence, it is possible to set the driving voltage low and perform high-speed modulation.

While the optical device 1A according to the first embodiment is used as it is as the optical modulation device 331 of the optical modulator for the optical head 3 of the pattern drawing apparatus 100 (corresponding to the "exposure apparatus" of the invention), the optical device according to the other embodiments may be used as the optical modulation device 331.

Figure 15:
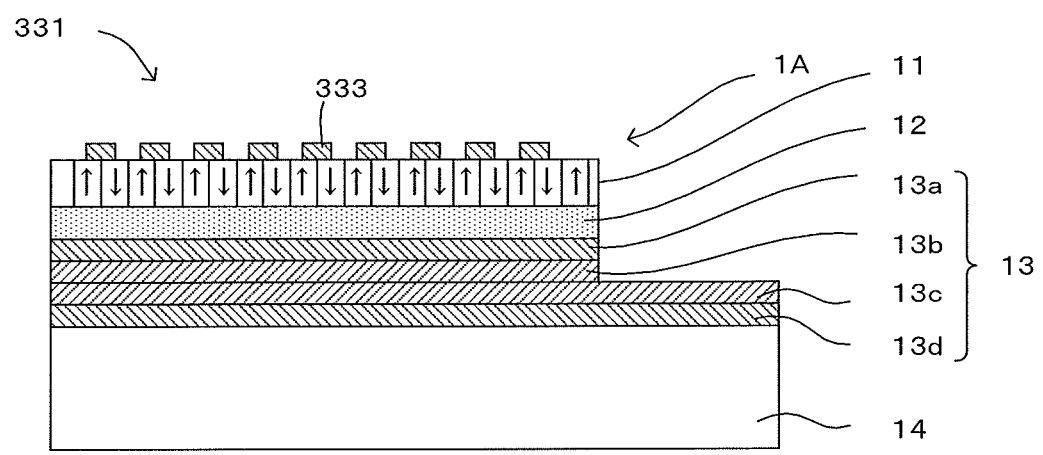
FIG. 15 is a view which shows another example of the spatial optical modulator using the optical device shown in FIG. 1.

Further, while the ferroelectric substrate 11 of the optical device 1A is disposed opposed to the electrode substrate 332 in which the plurality of electrodes 333 are formed and the optical modulator 33 is accordingly formed in the optical head 3 described above, for application of the optical device 1A to an optical modulator, a plurality of electrodes may be disposed on the other major surface S2A of the ferroelectric substrate 11 and the driving voltage may be applied to the respective electrodes from the modulation part as shown in FIG. 15 for instance.

In other words, further, an optical modulator can be formed using the optical device which has the structure described above and the optical modulator can be used in an exposure apparatus. That is, exposure apparatus according to this embodiment comprises: a light source which emits light; an optical modulator which modulates light emitted from the light source; and an optical device which irradiates light modulated by the optical modulator, wherein the optical modulator comprises: the optical device according to claim 1; a plurality of electrodes which are disposed on the other major surface of the ferroelectric substrate; and a modulation part which modulates light with a diffraction grating created inside the ferroelectric substrate by electric fields between the plurality of electrodes and the junction. Further, an optical device which further comprises a plurality of electrodes disposed on the other major surface of the ferroelectric substrate and which is capable of modulating the diffraction efficiency within the periodically poled structure as electric fields develops between the plurality of electrode and the junction may be an example of a favorable optical device to the optical modulator. In short, the optical device having such a structure functions as an optical modulation device of the optical modulator.

<Wavelength Conversion Element Using Optical Device>

An excellent effect is achieved by application of the optical device according to the invention to a wavelength conversion device. A wavelength conversion device to which the optical device 1A shown in FIG. 1 for instance is applied will now be described.

Figure 16A:
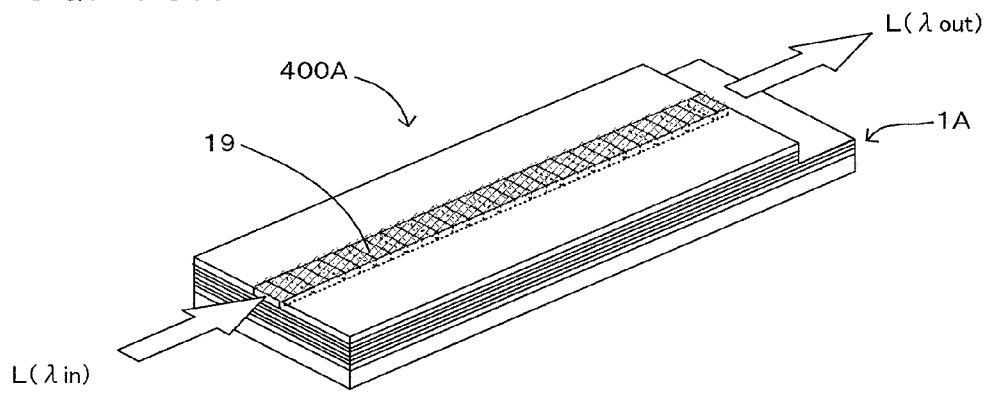
FIGS. 16A through 16C are views which show an example of the wavelength conversion device using the optical device shown in FIG. 1.
Figure 16B:
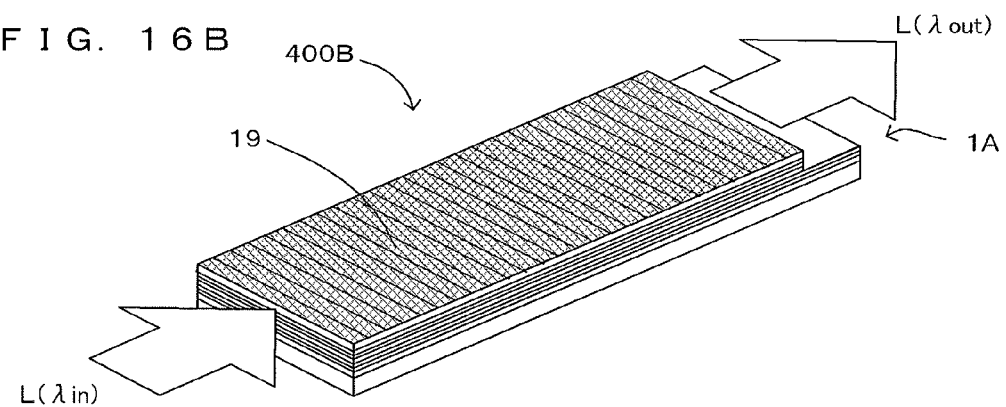
Figure 16C:
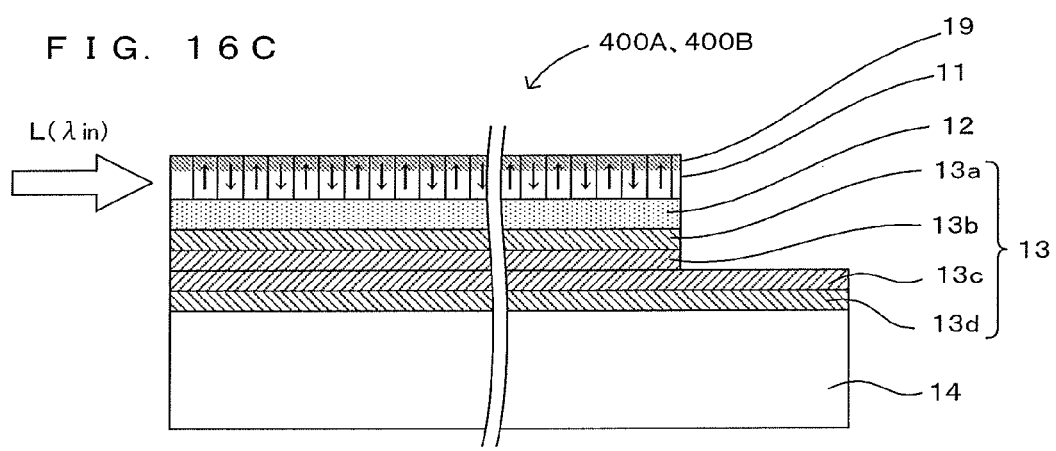

FIGS. 16A through 16C are drawings which show examples of a wavelength conversion device which uses the optical device according to the invention. FIG. 16A is a perspective view of a wavelength conversion device in which a domain inverted waveguide is formed locally within the ferroelectric crystals of the ferroelectric substrate, FIG. 16B is a perspective view of a wavelength conversion device which comprises a slab waveguide which has domain inverted in the entire ferroelectric crystals of the ferroelectric substrate, and FIG. 16C is a cross sectional view of the waveguide portions of the wavelength conversion devices shown in FIGS. 16A and 16B.

The wavelength conversion devices 400A and 400B shown in FIGS. 16A through 16C use the optical device 1A according to the first embodiment, and the proton exchanged waveguides 19 are formed in the ferroelectric crystals in the vicinity of the other major surface S2A of the ferroelectric substrate 11. A difference between the wavelength conversion device 400A shown in FIG. 16A and the wavelength conversion device 400B shown in FIG. 16B is the extent to which the proton exchanged waveguide 19 is formed. In the structure shown in FIG. 16A, light L($\lambda$in) enters upon the waveguide through a channel waveguide whose width is a few μm, and in the structure shown in FIG. 16B, light L($\lambda$in) enters upon the waveguide over a wide width through a slab waveguide which is wide in the direction of the width of the liquid crystals. The other structures remain the same. As for the both wavelength conversion devices 400A and 400B, after entering upon one end of the proton exchanged waveguide 19, the light L($\lambda$in) having the wavelength of $\lambda$in propagates inside the proton exchanged waveguide 19, and light L($\lambda$out) having a different wavelength out from the wavelength $\lambda$in is emitted at the other end surface of the proton exchanged waveguide 19.

The wavelength conversion devices 400A and 400B having the structures described above achieve the following effect. That is, since the periodic domain inverted region 11b is formed in the thin ferroelectric substrate 11 by the voltage application method in the optical device 1A as described above, it is possible to form at a high accuracy the periodically poled structure in the ferroelectric substrate 11 which is formed by the ferroelectric crystals. Further, it is possible to shorten the period of the domain inverted region 11b by thinning than those according to the conventional techniques, and therefore, it is possible to further shorten the conversion wavelength than those according to the conventional techniques, to form the periodically poled structure with a high accuracy, and improve the conversion efficiency. This makes it possible to fabricate a wavelength conversion device which has a high conversion efficiency and is responsive to ultraviolet light.

For example, although a large-size gas or solid laser has heretofore been usable as a UV source of the pattern drawing apparatus 100, a combination of any one of the wavelength conversion devices 400A and 400B with a compact-size high-power light source such as a semiconductor laser realizes a compact-size UV source of the wavelength conversion type. Further, since the wavelength conversion efficiency improves as the domain inverted structure is highly accurate, the UV source of the wavelength conversion type can be used for not only industrial use but for the medical use as well and it is considered that the application will be wide.

Figure 17A:
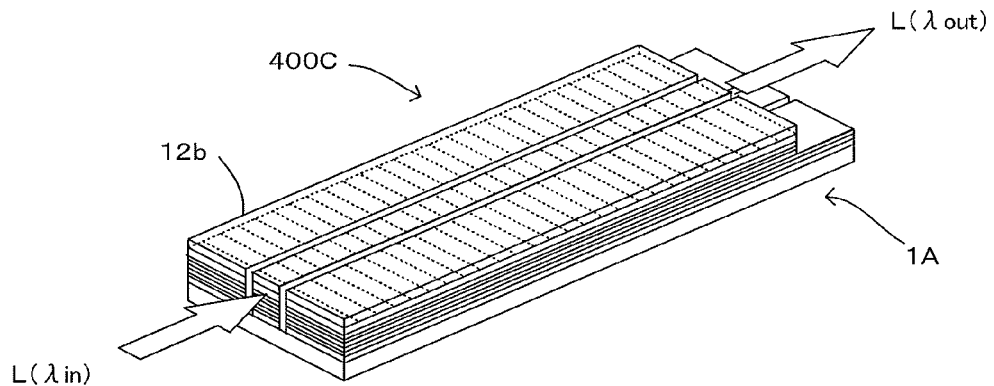
FIGS. 17A through 17C are views which show another example of the wavelength conversion device using the optical device shown in FIG. 1.
Figure 17B:
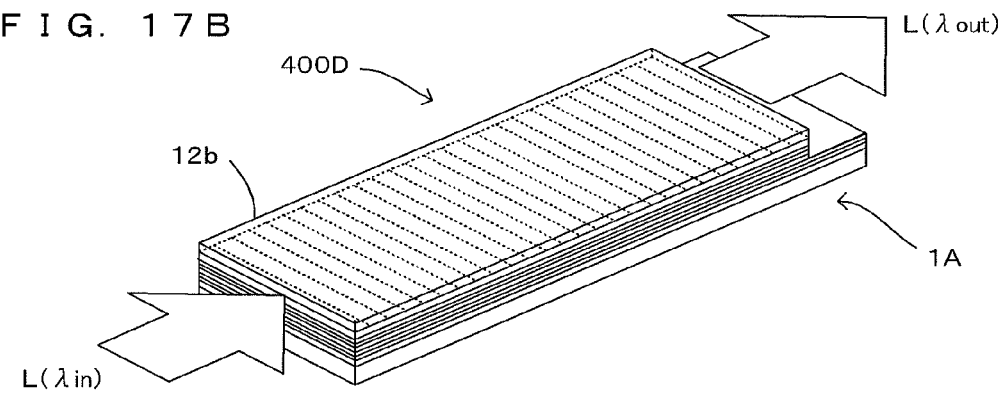
Figure 17C:
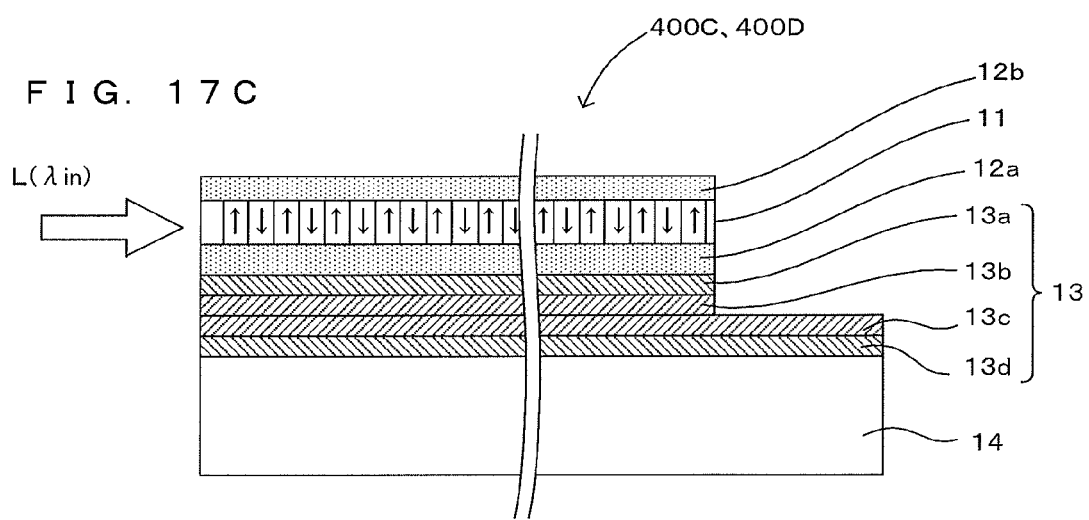

While the proton exchanged waveguide 19 is formed within the ferroelectric crystals of the optical device 1A in the wavelength conversion devices 400A and 400B described above, a similar effect of the wavelength conversion devices 400A and 400B is achieved by the wavelength conversion devices 400C and 400D in which the insulation layer 12b of $SiO_2$ or the like is formed on the other major surface S2A of the ferroelectric substrate 11 and a waveguide of the step index type is formed as shown in FIGS. 17A through 17C for example. In FIG. 17A in particular, light is contained as trenches of approximately a few μm indicating the direction of the width of the waveguide are engraved using a diamond cutter or the like.

Although the embodiments described above use the optical device 1A as the wavelength conversion device, other optical device may of course be used as the wavelength conversion device, in which case as well a similar effect is obtained.

<Others>

The invention is not limited to the embodiments described above but may be modified in various manners in addition to the embodiments above, to the extent not deviating from the object of the invention. For instance, although the second embodiment alone uses the patterned junction 13, a junction patterned in a similar way to that according to the second embodiment may be used as the junction 13 in the optical devices 1C through 1E according to the third through the fifth embodiments.

Further, while the chromium films are disposed as intermediate layers between the ferroelectric substrate 11 and gold (Au) since it is difficult to stably adhere gold (Au) to the ferroelectric substrate 11 in the embodiments described above, the intermediate layers may be made of titanium (Ti) or tantalum (Ta) instead of chromium (Cr).

Further, while the embodiment described above use $SiO_2$ as the insulation layer, a nitric oxide film ($SiO_xN_y$) or a transparent dielectric film of aluminum oxide ($Al_2O_3$) may be used instead.

The invention is applicable to an optical device having a periodically poled structure, a manufacturing method of the optical device and an exposure apparatus which uses the optical device.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A manufacturing method of optical device, comprising:
   a first step of integrating a ferroelectric substrate formed by ferroelectric crystals with a support plate which is thicker than the ferroelectric substrate to support the ferroelectric substrate with the support plate by a conductive junction between one major surface of the ferroelectric substrate and one major surface of the support plate;
   a second step of forming a pattern electrode which has a periodic pattern on the other major surface of the ferroelectric substrate; and
   a third step of applying a voltage between the pattern electrode and the junction and forming a periodic domain inverted region in the ferroelectric substrate,
   wherein the first step comprises the steps of:
   forming a first insulation layer on one major surface of the ferroelectric substrate;
   forming a first metal layer on the first insulation layer;
   forming a second metal layer on one major surface of the support plate; and joining the first metal layer with the second metal layer and accordingly integrating the ferroelectric substrate with the support plate to support the ferroelectric substrate with the support plate.

2. The manufacturing method of optical device according to claim 1, further comprising:
   a fourth step of removing the pattern electrode; and
   a fifth step of forming a second insulation layer on the other major surface of the ferroelectric substrate from which the pattern electrode has been removed.

3. The manufacturing method of optical device according to claim 1, further comprising:
   a fourth step of removing the pattern electrode; and
   a fifth step of forming a proton exchanged waveguide in the vicinity of the other major surface of the ferroelectric substrate from which the pattern electrode has been removed.

4. The manufacturing method of optical device according to claim 1, wherein the first step comprises a step of forming a proton exchanged waveguide in the ferroelectric substrate before integrating the ferroelectric substrate with the support plate.

5. The manufacturing method of optical device according to claim 1, wherein the support plate is formed by the same liquid crystals as the ferroelectric crystals of the ferroelectric substrate, and at the first step, the support plate and the ferroelectric substrate are integrated with each other while matching the crystal orientations of the support plate and the ferroelectric substrate with each other.

6. The manufacturing method of optical device according to claim 1, further comprising a sixth step of removing a surface area of the other major surface of the ferroelectric substrate integrated with the support plate and accordingly adjusting the thickness of the ferroelectric crystals to 0.1 μm through 200 μm.

7. A method of manufacturing optical device comprising a first step of integrating a ferroelectric substrate with a support plate to support the ferroelectric substrate with the support plate by a conductive junction between one major surface of the ferroelectric substrate and one major surface of the support plate, the ferroelectric substrate being formed by ferroelectric crystal having a periodically poled structure, the support plate being thicker than the ferroelectric substrate,
   wherein the first step comprises the steps of:
   forming a first insulation layer on one major surface of the ferroelectric substrate;
   forming a first metal layer on the first insulation layer;
   forming a second metal layer on one major surface of the support plate; and
   joining the first metal layer with the second metal layer and accordingly integrating the ferroelectric substrate with the support plate to support the ferroelectric substrate with the support plate.

8. The manufacturing method of optical device according to claim 7, further comprising a fourth step of forming a second insulation layer on the other major surface of the ferroelectric substrate.

9. The manufacturing method of optical device according to claim 7, further comprising a fourth step of forming a proton exchanged waveguide in the ferroelectric substrate.

* * * * *